United States Patent
Nagayama et al.

(10) Patent No.: US 9,919,971 B2
(45) Date of Patent: Mar. 20, 2018

(54) ZIRCONIA SINTERED BODY AND USE THEREOF

(71) Applicant: TOSOH CORPORATION, Shunan-shi (JP)

(72) Inventors: Hitoshi Nagayama, Ayase (JP); Naoki Shinozaki, Ayase (JP); Takeshi Ito, Ayase (JP); Koji Tsukuma; Shoichi Yamauchi, Ayase (JP)

(73) Assignee: TOSOH CORPORATION, Shunan-shi (JP)

( * ) Notice: Subject to any disclaimer, the term of this patent is extended or adjusted under 35 U.S.C. 154(b) by 0 days.

(21) Appl. No.: 15/107,053

(22) PCT Filed: Dec. 25, 2014

(86) PCT No.: PCT/JP2014/084324
§ 371 (c)(1),
(2) Date: Jun. 21, 2016

(87) PCT Pub. No.: WO2015/099048
PCT Pub. Date: Jul. 2, 2015

(65) Prior Publication Data
US 2016/0347666 A1  Dec. 1, 2016

(30) Foreign Application Priority Data

Dec. 27, 2013 (JP) ................................. 2013-272110
Dec. 27, 2013 (JP) ................................. 2013-272111
Dec. 27, 2013 (JP) ................................. 2013-272113

(51) Int. Cl.
C04B 35/488 (2006.01)
B32B 18/00 (2006.01)
(Continued)

(52) U.S. Cl.
CPC .......... *C04B 35/4885* (2013.01); *B32B 18/00* (2013.01); *C04B 35/488* (2013.01);
(Continued)

(58) Field of Classification Search
CPC ..... C04B 35/48; C04B 35/484; C04B 35/486; C04B 35/488; C04B 35/482
See application file for complete search history.

(56) References Cited

U.S. PATENT DOCUMENTS

| | | | | |
|---|---|---|---|---|
| 5,935,515 A * | 8/1999 | Hesse | ....................... | B44C 1/26 264/642 |
| 7,553,789 B2 * | 6/2009 | Fujisaki | ............... | C01G 25/006 106/459 |
| 7,871,950 B2 * | 1/2011 | Nakasuga | ............ | C01G 53/006 501/105 |
| 8,034,264 B2 * | 10/2011 | Ritzberger | ............... | A61C 5/10 118/303 |

(Continued)

FOREIGN PATENT DOCUMENTS

| JP | 62-108779 | 5/1987 |
|---|---|---|
| JP | 3-265565 A | 11/1991 |

(Continued)

OTHER PUBLICATIONS

International Search Report dated Feb. 24, 2015 in PCT/JP2014/084324 Filed Dec. 25, 2014.
(Continued)

*Primary Examiner* — Noah S Wiese
(74) *Attorney, Agent, or Firm* — Oblon, McClelland, Maier & Neustadt, L.L.P.

(57) ABSTRACT

To provide a zirconia sintered body which has at least two different color tones such as white and black, and which has no color bleeding or no gap between sintered bodies. A zirconia sintered body comprising a first zirconia sintered body and a second zirconia sintered body, characterized in that the first zirconia sintered body is a zirconia sintered body containing aluminum oxide; the second zirconia sintered body is a zirconia sintered body containing a spinel (Continued)

oxide; a bonding plane is formed between the first zirconia sintered body and the second zirconia sintered body; and it has no gap or no color bleeding at the bonding plane.

14 Claims, 12 Drawing Sheets

(51) Int. Cl.
  *C04B 35/626* (2006.01)
  *C04B 35/638* (2006.01)
  *C04B 35/645* (2006.01)

(52) U.S. Cl.
  CPC ........ *C04B 35/6261* (2013.01); *C04B 35/638* (2013.01); *C04B 35/6455* (2013.01); *C04B 2235/3206* (2013.01); *C04B 2235/3217* (2013.01); *C04B 2235/3222* (2013.01); *C04B 2235/3225* (2013.01); *C04B 2235/3244* (2013.01); *C04B 2235/3246* (2013.01); *C04B 2235/3272* (2013.01); *C04B 2235/3275* (2013.01); *C04B 2235/3284* (2013.01); *C04B 2235/5409* (2013.01); *C04B 2235/6022* (2013.01); *C04B 2235/656* (2013.01); *C04B 2235/6562* (2013.01); *C04B 2235/661* (2013.01); *C04B 2235/763* (2013.01); *C04B 2235/77* (2013.01); *C04B 2235/9661* (2013.01); *C04B 2237/348* (2013.01)

(56) References Cited

U.S. PATENT DOCUMENTS

| | | | |
|---|---|---|---|
| 8,173,562 B2 * | 5/2012 | Holand | .................... A61C 5/10 264/20 |
| 2007/0270304 A1 | 11/2007 | Fujisaki | |
| 2010/0240519 A1 | 9/2010 | Nakasuga et al. | |

FOREIGN PATENT DOCUMENTS

| | | |
|---|---|---|
| JP | 8-81255 A | 3/1996 |
| JP | 2007-308338 A | 11/2007 |
| JP | 4370361 B1 | 11/2009 |
| JP | 2011/020872 | 2/2011 |
| JP | 2011/020873 | 2/2011 |
| JP | 2011/020874 | 2/2011 |
| JP | 2011/020875 | 2/2011 |
| JP | 2011/020876 | 2/2011 |
| JP | 2011/020877 | 2/2011 |
| JP | 2011/020878 | 2/2011 |
| JP | 2011-191321 A | 9/2011 |
| JP | 2013/014471 | 1/2013 |
| WO | 2012/023805 | 3/2012 |

OTHER PUBLICATIONS

Supplementary European Search Report as received in the corresponding European Patent Application No. 14873927.9-1354 / 3088372 dated Jul. 18, 2017.

* cited by examiner

ZIRCONIA SINTERED BODY AND USE THEREOF

TECHNICAL FIELD

The present invention relates to a zirconia sintered body having zirconias with different color tones bonded by sintering. In particular, it relates to a zirconia sintered body wherein zirconias with different color tones are bonded by sintering, so that one zirconia forms a pattern on the other zirconia.

BACKGROUND ART

A zirconia sintered body can be made to be a member having a high-grade appearance, since it has glossiness in addition to high toughness and high strength. Thus, a zirconia sintered body is utilized, for example, as various members such as luxury timepiece members or ornaments. Despite being a member having a high-grade appearance, the color tone of the zirconia sintered body is monochromatic. Further, usually, zirconias having different color tones are different from each other in their behaviors in sintering. Therefore, when zirconias having different color tones were simultaneously sintered, breakage, cracking, strain, etc. were likely to result, and it was impossible to obtain a defect-free zirconia sintered body. Thus, it was impossible to obtain a zirconia sintered body having two or more different color tones, or a member made thereof.

In order to obtain a member having two or more different color tones using a zirconia sintered body, a member was studied wherein a zirconia sintered body was combined with a material other than a zirconia sintered body, having a color tone different from the zirconia sintered body (e.g. Patent Documents 1 to 3). However, in such a member, textures of the materials were substantially different. Therefore, the obtained member exhibited design characteristics different from a member made solely of ceramics, and particularly was one impairing the high-grade appearance specific to a zirconia sintered body.

Further, a ceramics-bonded product was known wherein at least two ceramics were bonded via an interlayer. However, such a ceramics-bonded product was likely to undergo breakage starting from a point in the interlayer. Therefore, such a product bonded via an interlayer is not desirable for a zirconia sintered body which is characterized by high toughness and high strength.

On the other hand, in Patent Document 4, a zirconia sintered body obtained by sintering two zirconia green bodies different in color tone, is reported. Patent Document 4 discloses a zirconia sintered body obtained by sintering a green body of a zirconia powder containing FeCrNi spinel and a green body of a zirconia powder containing CoAl.

PRIOR ART DOCUMENTS

Patent Documents

Patent Document 1: JP-A-2011-191321
Patent Document 2: JP-A-08-081255
Patent Document 3: Japanese Patent No. 4370361
Patent Document 4: JP-A-08-081255

DISCLOSURE OF INVENTION

Technical Problems

The sintered body disclosed in Patent Document 4 is made of zirconia sintered bodies, and therefore, there is no difference in texture between the materials. However, the sintered body has a "color migration zone" which can be visually observed between the zirconia sintered bodies having different color tones. Such a color migration zone is visible as "color bleeding". Due to the color bleeding, the boundary between the zirconia sintered bodies tends to be ambiguous. As a result, a portion where one zirconia sintered body and the other zirconia sintered body are in contact, particularly a pattern formed by one zirconia sintered body, becomes ambiguous. Such an ambiguous pattern gives an impression to further impair the high-grade appearance of the zirconia sintered body.

In Patent Document 4, a zirconia sintered body having no color migration zone is also disclosed. However, such a zirconia sintered body was one having a gap at the boundary between zirconia sintered bodies, since sintering was not sufficiently proceeded. That is, in the zirconia sintered body having no color migration zone in Patent Document 4, the color did not migrate due to the gap, and such a gap is visible as having a color tone different from each zirconia sintered body and tends to deteriorate the aesthetic appearance as a member. In addition, the gap present at the boundary between zirconia sintered bodies tends to become a starting point for breakage. Thus, such a zirconia sintered body was one which was very weak in mechanical strength and susceptible to breakage as a member.

Further, with the sintered body disclosed in Patent Document 4, it is necessary to make a pattern to be large enough so that color bleeding or the gap would not influence the aesthetic appearance as a member, and therefore, it cannot be made to be a sintered body having a fine pattern.

It is an object of the present invention to solve such problems and to provide a zirconia sintered body which has two or more different color tones and has aesthetic properties to show a high-grade appearance, and which has a sufficient strength to be used as a member. Particularly, it is another object of the present invention to provide a multicolored zirconia sintered body which comprises a zirconia sintered body showing any of white, pink, orange, lavender and other light colors, and a zirconia sintered body showing any of black, blue and other deep colors, and which has aesthetic properties to show a high-grade appearance and has a sufficient strength to be used as a member.

Solution to Problems

The present inventors have conducted a study extensively on a zirconia sintered body having two or more different color tones, particularly on a zirconia sintered body having two or more different color tones, wherein one zirconia is formed as a pattern on the same surface as the other zirconia.

As a result, they have found it possible to obtain a zirconia sintered body having two or more different color tones by simultaneously sintering a zirconia green body containing a spinel oxide and a zirconia green body containing other than a spinel oxide. Further, they have found that such a zirconia sintered body has a grain boundary as a bonding plane formed between one zirconia sintered body and the other zirconia sintered body, and the grain boundary has no color bleeding or no gap.

That is, the gist of the present invention is as follows.

[1] A zirconia sintered body comprising a first zirconia sintered body and a second zirconia sintered body, characterized in that the first zirconia sintered body contains at least either aluminum oxide or at least one lanthanoid selected from the group consisting of Ce, Pr, Nd, Eu, Tb, Ho, Er, Yb and Gd; the second zirconia sintered body contains a spinel oxide; a grain boundary is formed between the first zirconia sintered body and the second zirconia sintered body; and the grain boundary has no gap or no color bleeding.

[2] The zirconia sintered body according to the above [1], characterized in that either one zirconia sintered body of the first zirconia sintered body and the second zirconia sintered body forms a pattern on the same surface as the other zirconia sintered body.

[3] The zirconia sintered body according to the above [1] or [2], characterized in that the relative density is at least 99.5%.

[4] The zirconia sintered body according to any one of the above [1] to [3], characterized in that the first zirconia sintered body contains aluminum oxide.

[5] The zirconia sintered body according to any one of the above [1] to [4], characterized in that the first zirconia sintered body contains aluminum oxide in an amount of from 0.25 wt % to 20 wt %.

[6] The zirconia sintered body according to any one of the above [1] to [5], characterized in that the first zirconia sintered body contains at least one lanthanoid selected from the group consisting of Ce, Pr, Nd, Eu, Tb, Ho, Er, Yb and Gd.

[7] The zirconia sintered body according to the above [6], characterized in that the lanthanoid is contained in an amount of from 0.1 wt % to 6 wt %.

[8] The zirconia sintered body according to any one of the above [1] to [7], characterized in that the spinel oxide contained in the second zirconia sintered body is a spinel oxide containing iron and cobalt.

[9] The zirconia sintered body according to any one of the above [1] to [8], characterized in that the spinel oxide contained in the second zirconia sintered body has the following composition:

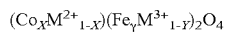

$(Co_X M^{2+}_{1-X})(Fe_Y M^{3+}_{1-Y})_2 O_4$ wherein $M^{2+}$ is at least either Zn or Mn, $M^+$ is either Al or Cr, $0.1 < X \leq 1$, and $0.5 < Y \leq 1$.

[10] The zirconia sintered body according to any one of the above [1] to [7], characterized in that the spinel oxide contained in the second zirconia sintered body is a spinel oxide containing cobalt and aluminum.

[11] The zirconia sintered body according to the above [10], characterized in that the second zirconia sintered body further contains a transition metal oxide.

[12] A process for producing a zirconia sintered body as defined in any one of the above [1] to [11], characterized by comprising a primary molding step of molding either one zirconia powder of a zirconia powder containing a lanthanoid oxide or aluminum oxide, or a zirconia powder containing a spinel oxide, to obtain a primary green body; a secondary molding step of molding the other zirconia powder on the primary green body at a molding temperature lower than the primary molding step, to obtain a secondary green body; a sintering step of firing the secondary green body at a temperature of at least 1,300° C. to obtain a preliminarily sintered body; and a HIP treatment step of subjecting the preliminarily sintered body to hot isostatic pressing treatment at a temperature of from 1,250° C. to 1,650° C. under from 100 MPa to 250 MPa.

[13] The process according to the above [12], characterized in that the molding in the second molding step is injection molding.

[14] A member containing the zirconia sintered body as defined in any one of the above [1] to [11].

Advantageous Effects of Invention

According to the present invention, it is possible to provide a multicolored zirconia sintered body which is a zirconia sintered body having two or more different color tones and which has no color bleeding or no gap between zirconia sintered bodies, and a member having a high-grade appearance by using such a multicolored zirconia sintered body.

DESCRIPTION OF EMBODIMENTS

Figure 1:
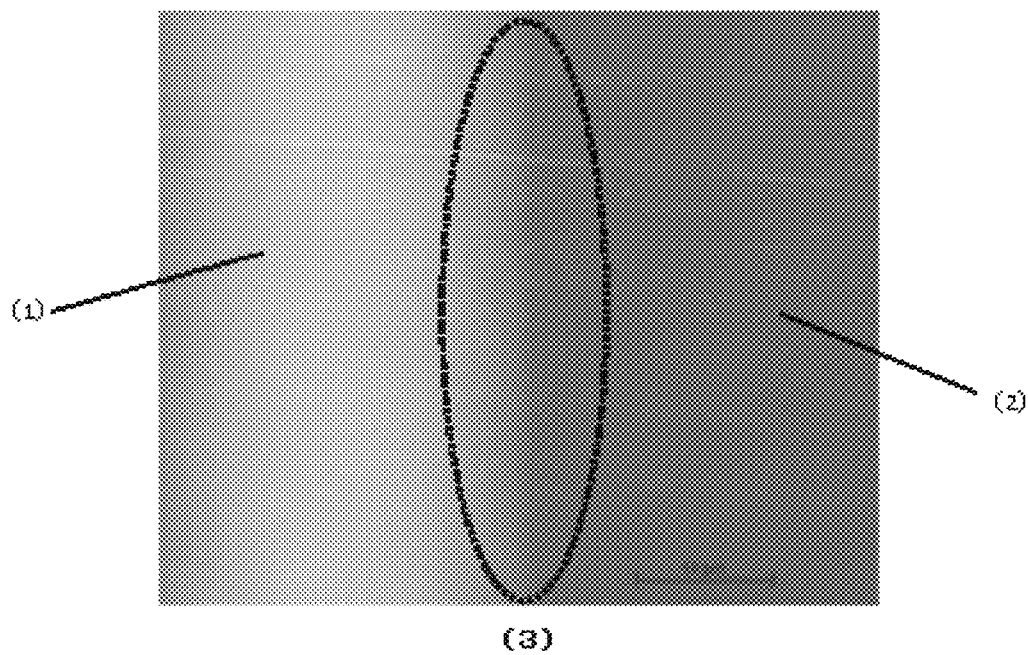
FIG. 1 is an optical micrograph of the white/black zirconia sintered body in Example 1.

The zirconia sintered body of the present invention is a zirconia sintered body (hereinafter referred to also as a "multicolored zirconia sintered body") comprising a first zirconia sintered body and a second zirconia sintered body.

The first zirconia sintered body (hereinafter referred to also as the "light-colored sintered body") and the second zirconia sintered body (hereinafter referred to also as the "deeply colored sintered body") are zirconia sintered bodies having color tones different from each other.

The multicolored zirconia sintered body of the present invention comprises the deeply colored sintered body containing a spinel oxide as a colorant and the light-colored sintered body containing other than a spinel oxide as a colorant, whereby for the first time, it becomes a member which is composed solely of zirconia and yet exhibits a high-grade aesthetic appearance.

In the multicolored zirconia sintered body of the present invention, the light-colored sintered body and the deeply colored sintered body have a grain boundary formed between them, whereby the two sintered bodies are bonded. Here, the grain boundary (hereinafter referred to also as the "interface") between the light-colored sintered body and the deeply colored sintered body is formed by sintering. The interface is sintered, whereby such an interface becomes a bonding plane having no defects, such as cracks, strain, etc. Thus, the interface is unlikely to become a starting point for breakage. Therefore, the multicolored zirconia sintered body of the present invention is useful also as a member which is required to have the strength intrinsic to a zirconia sintered body.

As the light-colored sintered body and the deeply colored sintered body are sintered, they become a single zirconia sintered body having them bonded to each other. Therefore, the multicolored zirconia sintered body of the present invention contains a grain structure which has a crystal grain structure wherein crystal grains of the light-colored sintered body and crystal grains of the deeply colored sintered body are sintered, in addition to a structure wherein crystal grains of the light-colored sintered body are sintered to one another and a structure wherein crystal grains of the deeply colored sintered body are sintered to one another.

Thus, the multicolored zirconia sintered body of the present invention is different from a zirconia composite body or a zirconia bonded body not having such a grain structure. Such a zirconia composite body or a zirconia bonded body is composed solely of a structure wherein crystal grains of a light-colored sintered body are sintered to one another and a structure wherein crystal grains of a deeply colored sintered body are sintered to one another.

Here, the zirconia composite body may, for example, be a zirconia composite body obtained by separately sintering a light-colored sintered body and a deeply colored sintered body, followed by combining them. The zirconia bonded body may, for example, be a zirconia bonded body obtained by integrating a light-colored sintered body and a deeply colored sintered body via an adhesive layer or any other intermediate layer.

The interface in the present invention can be confirmed by an electron image obtainable by an electron microscopic observation by means of e.g. a scanning electron microscope (hereinafter referred to as "SEM"), or by observation by means of an optical microscope. Namely, the light-colored sintered body and the deeply colored sintered body have different color tones. Therefore, in the optical microscopic observation, the interface can be confirmed by a portion where the color tone is changed. Further, the light-colored sintered body and the deeply colored sintered body contain different coloring components. Due to the difference in coloring components, their electron images exhibit different color tones, and therefore, in an electron image, the interface can be confirmed by a portion where the color tone is changed.

FIG. 1 is an optical micrograph showing an example of the multicolored zirconia sintered body of the present invention. In FIG. 1, the region of (1) is the light-colored sintered body, and the region of (2) is the deeply colored sintered body. From FIG. 1, due to a difference in color tone in the optical micrograph, it is possible to confirm the interface (3) being a boundary portion of the regions of (1) and (2) (e.g. the dashed oblong portion in FIG. 1).

Figure 2:
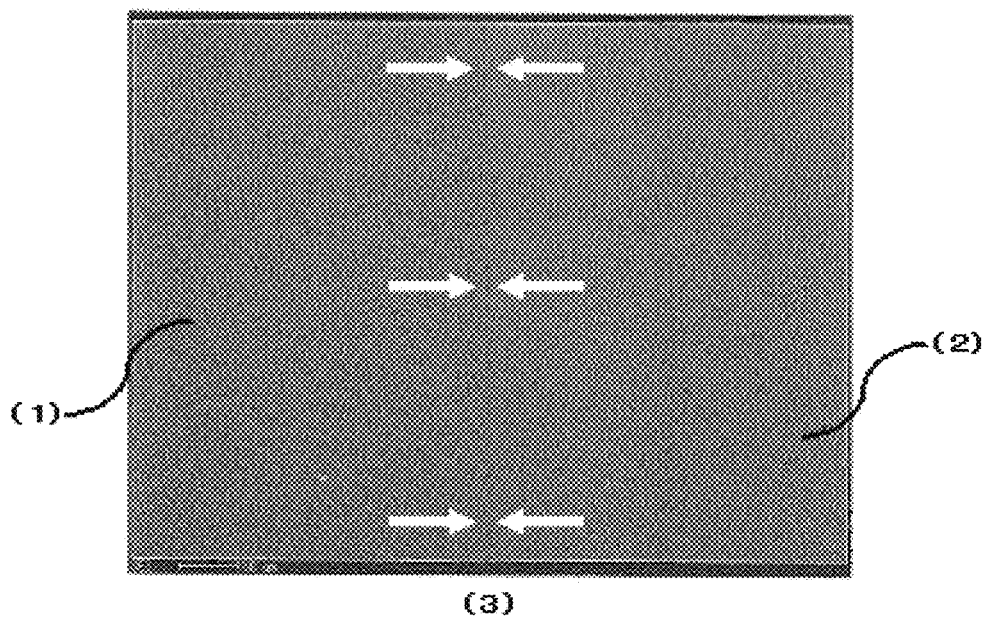
FIG. 2 is a secondary electron image (the scale in the Fig. is 50 μm) of the white/black zirconia sintered body in Example 1.

Further, FIG. 2 is a view showing an example of a secondary electron image obtained by a SEM observation of the multicolored zirconia sintered body of the present invention. In FIG. 2, the region of (1) is the light-colored sintered body, and the region of (2) is the deeply colored sintered body. From FIG. 2, due to a difference in color tone in the secondary electron image, it is possible to confirm the interface (3) being a boundary portion of the regions of (1) and (2) (e.g. the portion indicated by arrows in FIG. 2).

In the multicolored zirconia sintered body of the present invention, the light-colored sintered body and the deeply colored sintered body are bonded by sintering. Further, it is preferred that either one zirconia sintered body of the light-colored sintered body or the deeply colored sintered body has concaves, and the other zirconia sintered body has convexes, and the light-colored sintered body and the deeply colored sintered body are laminated and bonded so that the concaves and the convexes are fitted. Such fitting of the zirconia sintered bodies to each other may be made to form a pattern free from difference in level or a gap at the surface of the multicolored zirconia sintered body of the present invention.

The multicolored zirconia sintered body of the present invention thus has an interface formed between the light-colored sintered body and the deeply colored sintered body, and yet, the interface has no gap. Thus, the multicolored zirconia sintered body of the present invention exhibits an aesthetic appearance made solely of a zirconia sintered body and may be made to be a member which presents an impression of a higher grade. Further, since there is no gap at the interface, breakage of the sintered body starting from the interface is less likely to occur, and the mechanical properties intrinsic to a zirconia sintered body are not impaired.

In the present invention, the gap is a gap formed at the interface being the bonding plane between the light-colored sintered body and the deeply colored sintered body, or in the vicinity thereof, which can be confirmed by an electron image of at least either a secondary electron image or a reflection electron image (such an image may collectively be referred to simply as an "electron image") obtainable by an optical microscopic observation or a SEM observation with at most 500 magnifications.

It is preferred that the multicolored zirconia sintered body of the present invention does not contain fine gaps such as ones confirmed by an electron image obtainable by a SEM observation with more than 500 magnifications. However, when the multicolored zirconia sintered body of the present invention is to be used as various members, it may have gaps observable in an electron image obtained by a transmission electron microscope (hereinafter referred to as "TEM") observation or a SEM observation with more than 500 magnifications. Such fine gaps are not substantially influential over the aesthetic appearance of a member.

In FIG. 2, due to a difference in color tone in the secondary electron image, the interface (3) being a boundary portion of the regions of (1) and (2) can be confirmed (e.g. the portion indicated by arrows in FIG. 2). Here, the interface confirmed in FIG. 2 is a continuous interface, and no gap is observed at the interface.

Figure 3:
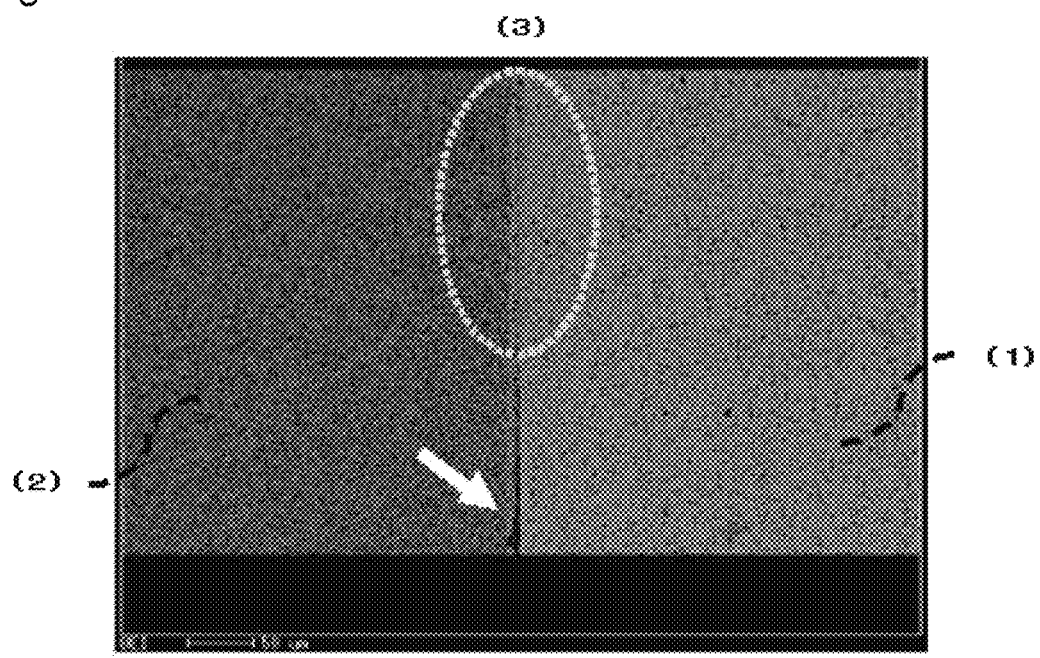
FIG. 3 is a reflection electron image (the scale in the Fig. is 50 μm) of the white/black zirconia sintered body in Comparative Example 1.

On the other hand, FIG. 3 is a view showing a reflection electron image obtained by a SEM observation with 500 magnifications, of a multicolored zirconia sintered body having a gap at the interface. In FIG. 3, the region of (1) is the light-colored sintered body, and the region of (2) is the deeply colored sintered body. The interface between them is not an interface formed continuously and was partly an interface (the dashed oblong portion in FIG. 3). Further, it can be confirmed that a part of the interface is peeled to form a gap (the portion indicated by an arrow in FIG. 3).

In the multicolored zirconia sintered body of the present invention, the light-colored sintered body and the deeply colored sintered body have an interface formed between them, and the interface has no color bleeding, whereby the boundary between the light-colored sintered body and the deeply colored sintered body becomes distinct, and the multicolored zirconia sintered body of the present invention can be made to be a member having a distinct pattern. Further, the pattern formed by one zirconia sintered body can be made to be a fine pattern.

The color bleeding is a portion showing a color tone having the color tone of the light-colored sintered body and the color tone of the deeply colored sintered body mixed, which is observed visually or by an optical microscope. Further, the color bleeding at the interface is a region of the interface or in the vicinity of the interface (hereinafter referred to also as a "migration region") including the color tone of the other zirconia sintered body, as observed in either one zirconia sintered body of the light-colored sintered body and the deeply colored sintered body, which is observed visually or by an optical microscope. In the present invention, it is particularly meant for a region of the interface or in the vicinity of the interface including the color tone of the deeply colored sintered body, as observed in the light-colored sintered body, which is observed visually or by an optical microscope. The presence or absence of the color bleeding at the interface can be confirmed by observing the multicolored zirconia sintered body visually or by an optical microscope with e.g. from 10 to 100 magnifications.

Figure 4:
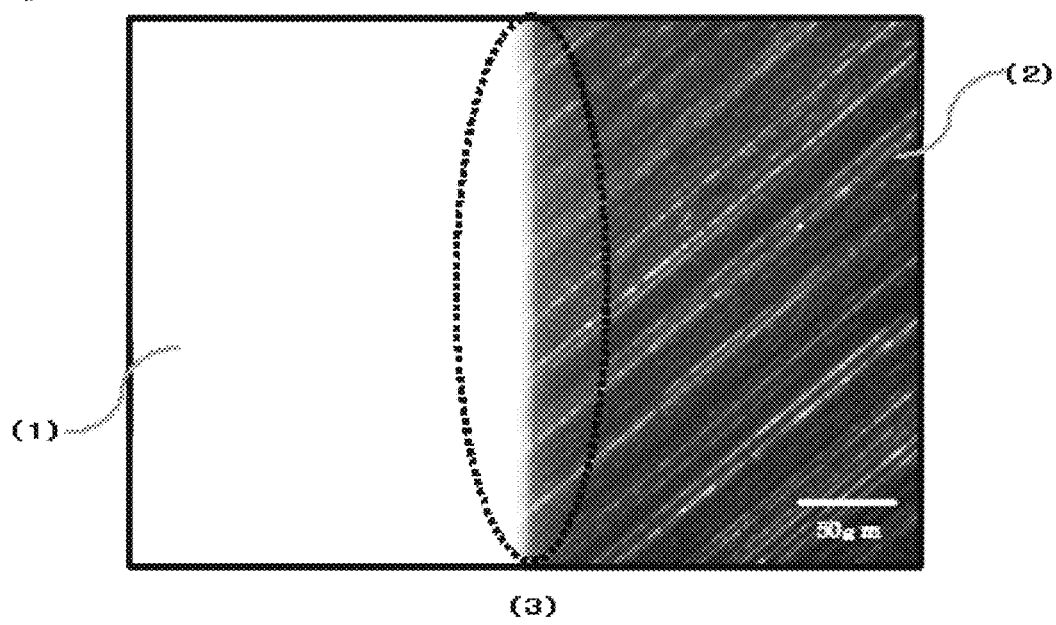
FIG. 4 is an optical micrograph (the scale in the Fig. is 50 μm) of the interface of the white/black zirconia sintered body in Example 1.

FIG. 4 is a view showing an optical micrograph of a multicolored zirconia sintered body of the present invention. In FIG. 4, from the difference in color tone in the optical micrograph, the interface (3) being a boundary portion of the regions of (1) and (2) is distinct, and it can be confirmed that the multicolored zirconia sintered body of the present invention has no color bleeding.

Figure 5:
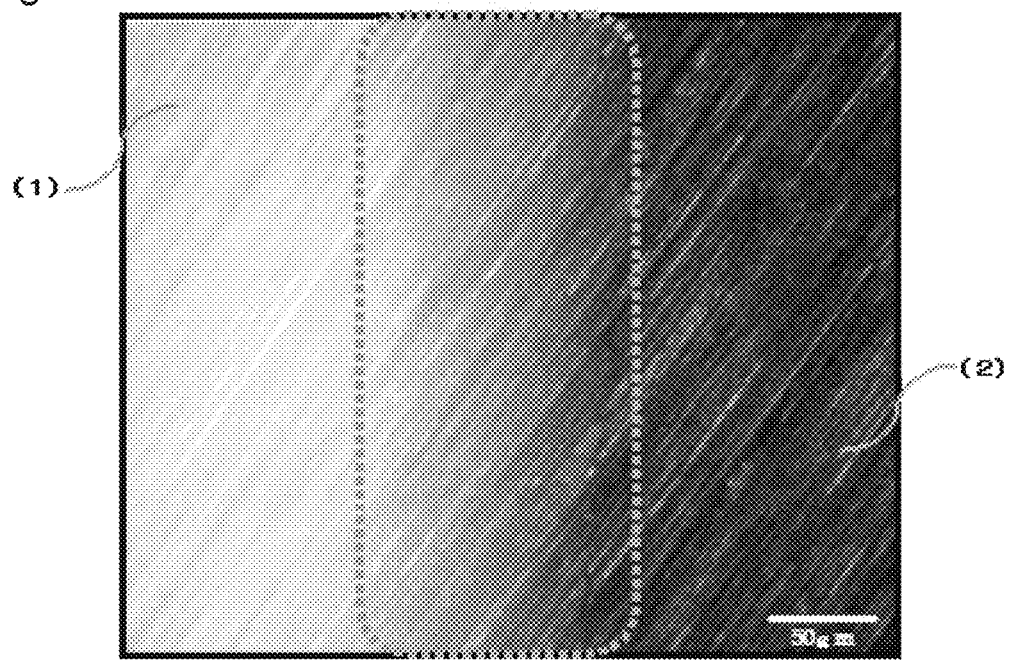
FIG. 5 is an optical micrograph (the scale in the Fig. is 50 μm) of the white/black zirconia sintered body in Comparative Example 3.

On the other hand, FIG. 5 is an optical micrograph showing an example of a multicolored zirconia sintered body having color bleeding. In FIG. 5, the region of (1) is a light-colored sintered body, and the region of (2) is a deeply colored sintered body. From FIG. 5, the boundary portion of the regions of (1) and (2) is blurred, and the vicinity of the interface is fuzzy (e.g. the dashed rectangular portion in FIG. 5). Such a multicolored zirconia sintered body can be confirmed to have color bleeding in the vicinity of the interface.

The multicolored zirconia sintered body of the present invention may have a migration region not observable visually or by an optical microscope. Such a migration region not observable visually or by an optical microscope is not substantially influential over the aesthetic appearance when the multicolored zirconia sintered body of the present invention is used as various members.

Such a migration region not observable visually or by an optical microscope may, for example, be a region of either one zirconia sintered body of the light-colored sintered body or the deeply colored sintered body, which is a region of the other zirconia sintered body containing the coloring component contained in one zirconia sintered body.

The coloring component contained in the migration region would not be color bleeding, when it is at most 3 wt %, preferably at most 2.5 wt %, or more preferably at most 2 wt %. Here, the presence or absence of the migration region and the amount of the coloring component contained in the region, are obtainable by a quantity point analysis by an electron micro-analyzer (hereinafter referred to also as "EPMA analysis") of a region of the light-colored sintered body at a predetermined distance from the interface, and the amount is a proportion by weight of the coloring component to the weight of all elements.

Figure 6:
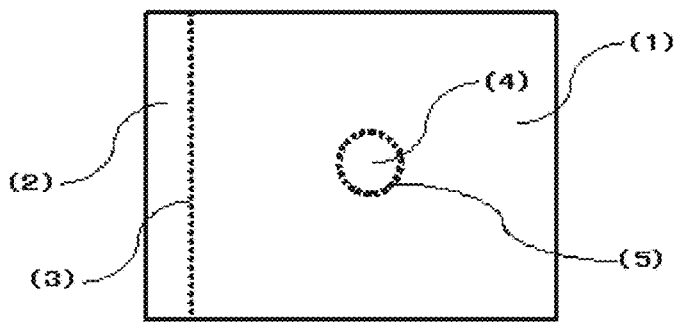
FIG. 6 is a schematic view illustrating measurement of a migration region by a quantity point analysis of EPMA.

FIG. 6 is a schematic view illustrating measurement of a migration region by the EPMA analysis. In FIG. 6, the region of (1) is a light-colored sintered body, the region of (2) is a deeply colored sintered body, and (3) is the interface. Further, the region of (4) is the light-colored sintered body at a predetermined distance from the interface, and (5) is a circle with a diameter of 10 μm formed by taking the region of (4) at the center. In the EPMA analysis, all elements contained in (5) are analyzed, and if a coloring component is contained, the region is regarded as a migration region. In the present invention, the EPMA analyses were conducted with respect to a plurality of regions (corresponding to the region of (4) in FIG. 6) different in distance from the interface, and the region containing a coloring component, corresponding to the maximum distance from the interface, was taken as the migration region of the coloring component in the sample.

The migration region is a region corresponding to the maximum distance from the interface, wherein the coloring component is contained, and it may be a region within 200 μm, preferably a region within 150 μm, more preferably a region within 100 μm, from the interface, and particularly is a region of a light-colored sintered body within 200 μm, preferably a region of a light-colored sintered body within 150 μm, more preferably a region of a light-colored sintered body within 100 μm, from the interface.

When the migration region is within the above range and amount of the coloring component, the multicolored zirconia sintered body of the present invention has no color bleeding influential over the aesthetic appearance at the time of using it as a member.

The coloring component contained in the migration region may, for example, be a metal element constituting a spinel oxide contained in the deeply colored sintered body, or at least either iron (Fe) or cobalt (Co).

For example, the light-colored sintered body contained in the multicolored zirconia sintered body of the present invention may be such that the migration region is a region within 100 μm from the interface, and that region contains iron in an amount of at most 1 wt %, preferably at most 0.6 wt %, more preferably at most 0.3 wt %, but a region beyond the migration region contains no iron. In this case, the migration region of iron is within 100 μm from the interface.

Further, the light-colored sintered body contained in the multicolored zirconia sintered body of the present invention may be such that a region within 100 μm, preferably a region within 50 μm, from the interface, contains cobalt in an amount of at most 0.5 wt %, preferably at most 0.3 wt %, and a region beyond 100 μm from the interface contains no cobalt. In this case, the migration region of cobalt is within 50 μm from the interface. However, in a case where the region within 50 μm contains substantially no cobalt (0 wt %), no migration region of cobalt is present, or the migration region of cobalt is a region closer to the interface than 50 μm from the interface.

In the multicolored zirconia sintered body of the present invention, either one zirconia sintered body of the light-colored sintered body or the deeply colored sintered body preferably forms a pattern on the same surface as the other zirconia sintered body. The multicolored zirconia sintered body of the present invention can form a finer pattern as compared with conventional ones, whereby not only the designability will be improved, but also it becomes possible to provide a multicolored zirconia sintered body for a member useful for a wide range of applications.

In the present invention, a pattern is a diagrammatic drawing, a graphic or a combination thereof, formed on a part of either one zirconia sintered body of the light-colored sintered body or the deeply colored sintered body, by the other zirconia sintered body. As a specific diagrammatic drawing, a line pattern such as a solid line, a dashed line, a wavy line or the like, a numeral or a letter, may be exemplified. As the graphic, a circular shape, or a geometric shape such as a polyhedral shape, may be exemplified.

In the multicolored zirconia sintered body of the present invention, the light-colored sintered body may form a pattern on the same surface as the deeply colored sintered body, or otherwise, the deeply colored sintered body may form a pattern on the same surface as the light-colored sintered body.

The multicolored zirconia sintered body of the present invention can form a pattern of a size used to be obtained by a conventional multicolored zirconia sintered body. In addition, it can form a distinct pattern even within a finer range than the conventional one. A pattern may be formed distinctly, for example, in a region of at most 1 cm$^2$, further a region of at most 1 mm$^2$, more further a region of at most 0.5 mm$^2$, still further a region of at most 0.05 mm$^2$, even further a region of at most 0.005 mm$^2$. Further, a pattern which the multicolored zirconia sintered body of the present invention may have, may, for example, be a diagrammatical drawing with a broad line at a level of 150 μm, diagrammatical drawings or graphics at intervals of about 150 μm, or graphics with a diameter of at most 1 mm, further with a diameter of at most 0.5 mm.

The multicolored zirconia sintered body of the present invention may have an optional shape and an optional pattern. For example, examples of the shape and pattern of the multicolored zirconia sintered body of the present invention are shown in FIGS. 7 to 12.

Figure 7:
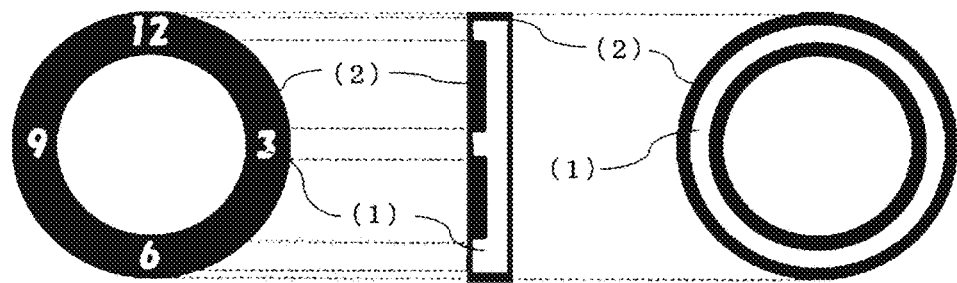
FIG. 7 is a schematic view illustrating an example of a bezel ring for a timepiece made of a multicolored zirconia sintered body of the present invention.

For example, FIG. 7 is a schematic view of a multicolored zirconia sintered body having a shape of a bezel ring for a timepiece, to constitute a bezel ring surface. The left view is a front view, the center view is a side view, and the right view is a rear view. The front view shows that the bezel ring surface is made of a deeply colored sintered body ((2) in the left view in FIG. 7), and it has a pattern in the form of Arabic numerals made of a light-colored sintered body ((1) in the left view in FIG. 7) on the same surface. The side view shows that the multicolored zirconia sintered body is such that on the light-colored sintered body having convexes in the form of Arabic numerals, the deeply colored sintered body having concaves in the same form as the Arabic numerals, is laminated (the center view in FIG. 7). Further, the light-colored sintered body is in the form of a ring with a hollow portion, and the light-colored sintered body and the deeply colored sintered body are laminated (the right view in FIG. 7).

Figure 8:
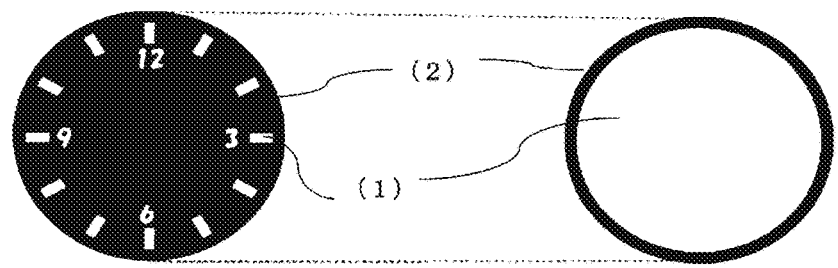
FIG. 8 is a schematic view illustrating an example of the face for a timepiece made of a multicolored zirconia sintered body of the present invention.
Figure 9:
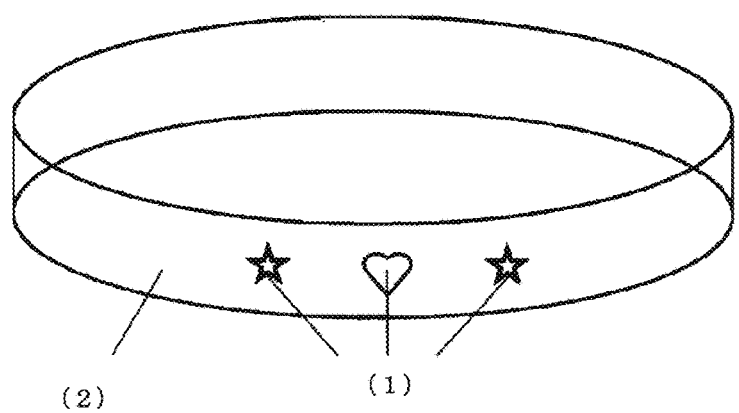
FIG. 9 is a schematic view illustrating an example of a bracelet made of a multicolored zirconia sintered body of the present invention.
Figure 10:
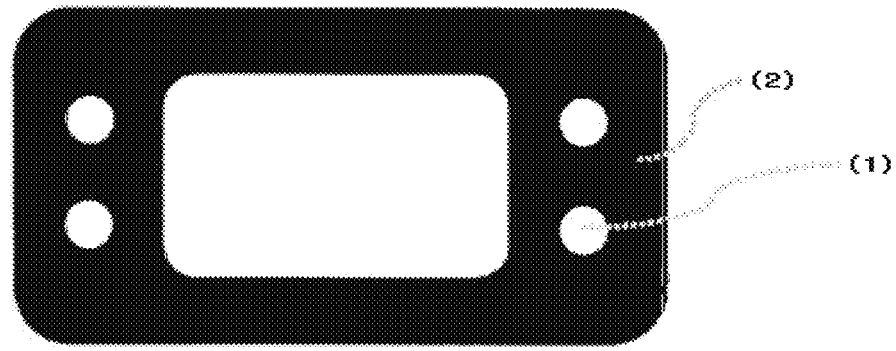
FIG. 10 is a schematic view illustrating an example of a housing made of a multicolored zirconia sintered body of the present invention.
Figure 11:
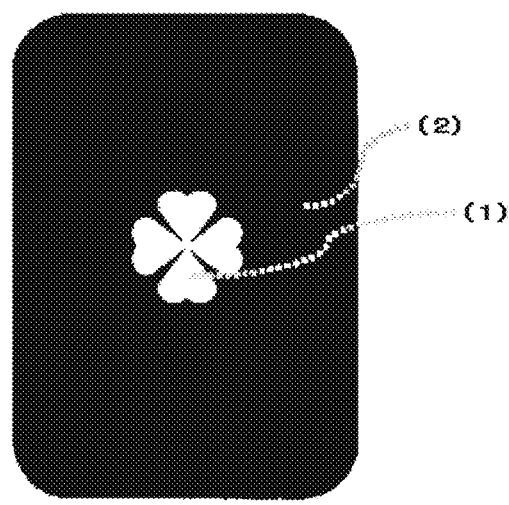
FIG. 11 is a schematic view illustrating an example of a cover for a cell-phone made of a multicolored zirconia sintered body of the present invention.
Figure 12:
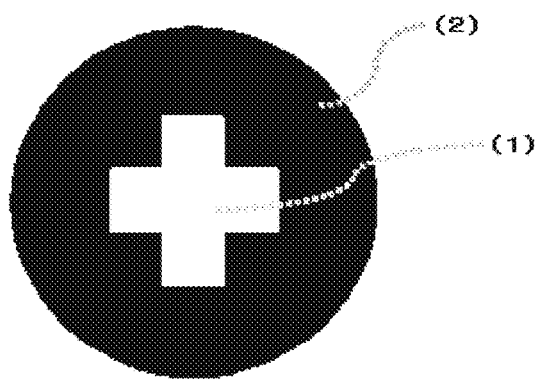
FIG. 12 is a schematic view illustrating an example of a disk-shaped sintered body made of a multicolored zirconia sintered body of the present invention.

Further, for example, FIG. 8 is a schematic view of a multicolored zirconia sintered body having a shape of the face for a timepiece. The left view is a front view, and the right view is a rear view. FIG. 8 shows a sintered body having a disc shape, and its surface is made of a deeply colored sintered body. The surface of the sintered body has a light-colored sintered body in the form having a line figure of a portion corresponding to each hour of from 1 to 12 hours of an analog timepiece, and a pattern in the form of Arabic numerals of 3, 6, 9 and 12. Further, the light-colored sintered body has a disc shape, and the light-colored sintered body and the deeply colored sintered body are laminated (the right view in FIG. 8).

FIGS. 9 to 12 are schematic views showing multicolored zirconia sintered bodies having a shape of a bracelet, a shape of a housing, a shape of a cover for a cell-phone and a disc shape, respectively.

Since the light-colored sintered body and the deeply colored sintered body are bonded by sintering, the multicolored zirconia sintered body of the present invention has a high density. The relative density of the multicolored zirconia sintered body of the present invention is preferably at least 99.5%, more preferably at least 99.7%. When the relative density is at least 99.5%, not only no gap will be present at the interface, but also defects at portions other than the interface will be less. Thus, the mechanical strength of the multicolored zirconia sintered body of the present invention thereby tends to be higher.

Whereas, a zirconia composite body or a zirconia bonded body is one having different zirconia sintered bodies combined after sintering. Therefore, even if the relative densities of the zirconia sintered bodies constituting such a combination were at least 99.5%, respectively, the relative density of the zirconia composite body or the zirconia bonded body would not be at least 99.5%.

In the present invention, the relative density of a multicolored zirconia sintered body can be obtained by the following formula (1).

Relative density (%)=Measured density (g/cm³) of multicolored zirconia sintered body/theoretical density (g/cm³) of multicolored zirconia sintered body×100     (1)

The measured density (sintered body density) of a multicolored zirconia sintered body can be obtained by an Archimedes method.

Further, the theoretical density of a multicolored zirconia sintered body can be calculated by the following formula from the respective densities and volume ratio of a light-colored sintered body and a deeply colored sintered body.

$$M=(Ma \cdot X+Mb \cdot Y)/(X+Y) \quad (1')$$

In the above formula (1'), M is the theoretical density (g/cm³) of the multicolored zirconia sintered body, Ma is the theoretical density (g/cm³) of the light-colored sintered body, Mb is the theoretical density (g/cm³) of the deeply colored sintered body, X is the volume ratio of the light-colored sintered body to the volume of the multicolored zirconia sintered body, and Y is the volume ratio of the deeply colored sintered body to the volume of the multicolored zirconia sintered body.

In the formula (1'), Ma and Mb are different depending upon the compositions of the light-colored sintered body and the deeply colored sintered body. Ma and Mb can be obtained from the theoretical densities of compounds constituting the respective sintered bodies and the weight ratio of such compounds. The theoretical densities of compounds constituting the respective sintered bodies may, for example, be as follows.

| | |
|---|---|
| Black zirconia: | 6.05 g/cm³ |
| 3 mol % yttria-containing zirconia: | 6.09 g/cm³ |
| Aluminum oxide: | 3.98 g/cm³ |
| Aluminum oxide cobalt spinel: | 4.42 g/cm³ |
| Iron oxide: | 5.24 g/cm³ |

X in the formula (1') is a volume ratio obtained by multiplying Ma by the weight ratio of the light-colored sintered body to the weight of the multicolored zirconia sintered body, and Y is a volume ratio obtained by multiplying Mb by the weight ratio of the deeply colored sintered body to the weight of the multicolored zirconia sintered body.

The light-colored sintered body and the deeply colored sintered body contain a stabilizer in an amount of preferably from 2 mol % to 6 mol %, more preferably from 2.5 mol % to 4 mol %, further preferably from 2.5 mol % to 3.5 mol %, still further preferably from 2.8 mol % to 3.2 mol %. As they contain a stabilizer within such a range, such zirconia sintered bodies become zirconia sintered bodies wherein the crystal structure is tetragonal. Thus, they become sintered bodies having high mechanical strength.

The stabilizer is preferably at least one member selected from the group consisting of yttria, calcia, magnesia and scandia, more preferably yttria.

The light-colored sintered body contained in the multicolored zirconia sintered body of the present invention is a zirconia sintered body which contains at least either aluminum oxide (alumina) or at least one lanthanoid (hereinafter referred to also as "light-colored lanthanoid") selected from the group consisting of Ce, Pr, Nd, Eu, Tb, Ho, Er, Yb and Gd. The light-colored sintered body thereby becomes a zirconia sintered body having a color tone lighter than the deeply colored sintered body containing a spinel oxide.

The coloration of the light-colored sintered body may be a desired color tone, and for example, the value of L* in the L*a*b* color system may be higher by at least 20 than the deeply colored sintered body. Further, L* in the L*a*b* color system of the light-colored sintered body may be exemplified to be at least 55.

In a case where the light-colored sintered body is a white zirconia sintered body, such a light-colored sintered body preferably contains aluminum oxide (alumina). When it contains alumina, alumina particles will be distributed among zirconia crystal grains. Transparency intrinsic to zirconia is thereby suppressed, whereby the light-colored sintered body becomes a zirconia sintered body exhibiting a distinct white color. Further, as the light-colored sintered body contains, in addition to zirconia, only a stabilizer and alumina, it becomes possible to accelerate formation of an interface having no gap or no color bleeding, during the sintering.

The content of alumina is preferably from 0.25 wt % to 20 wt %, more preferably from 1 wt % to 15 wt %, further preferably from 5 wt % to 10 wt %, as the alumina weight to the light-colored sintered body weight. When alumina is contained in this range, the color tone of the light-colored sintered body becomes to be clear white. Further, when the content of alumina is within the above range, sintering of zirconia will proceed without being hindered by alumina particles.

When the light-colored sintered body exhibits a white color, such coloration is, as represented by L*, a* and b* in the L*a*b* color system (hereinafter also referred to simply as "L*", "a" and "b*", respectively), preferably L*=from 85 to 100, a*=from −2 to 2 and b*=from −2 to 3.0, more preferably L*=from 85 to 95, a*=from −1 to −0.5 and b*=from 0 to 1.5, further preferably L*=from 85 to 93, a*=from −1 to −0.4 and b*=from 0.5 to 1.3. When luminance L* is at least 85, and each of a* and b* is in the vicinity of 0, the light-colored sintered body becomes a white zirconia sintered body exhibiting clear pure white with no coloration. Thus, by a combination with such a light-colored sintered body, a member can be made to have a higher aesthetic appearance.

In a case where the light-colored sintered body is a light-colored zirconia sintered body other than the white zirconia sintered body, such a light-colored sintered body contains preferably at least one lanthanoid selected from the group consisting of Ce, Pr, Nd, Eu, Tb, Ho, Er, Yb and Gd, more preferably at least one member selected from the group consisting of Er, Pr and Nd. The light-colored sintered body will thereby exhibit a color tone which is paler than the color tone of the deeply colored sintered body and which is a light color tone other than white. For example, the light-colored sintered body becomes a pink zirconia sintered body when it contains erbium (Er), it becomes an orange colored zirconia sintered body when it contains praseodymium (Pr), and it becomes a lavender zirconia sintered body when it contains neodymium (Nd).

The content of a light-colored lanthanoid may be an amount solid-solubilizable in zirconia of the light-colored sintered body, and to the zirconia weight of the light-colored sintered body, the light-colored lanthanoid is preferably from 0.1 wt % to 6 wt %, more preferably from 0.3 wt % to 3.5 wt %.

In the case where the light-colored sintered body is a light-colored zirconia sintered body other than the white zirconia sintered body, it may contain, in addition to the light-colored lanthanoid, a very small amount of alumina. In such a case, alumina contained in the light-colored sintered body is at most 0.5 wt %, preferably at most 0.3 wt %, more preferably at most 0.25 wt % to the zirconia weight of the light-colored sintered body. If the content of alumina exceeds 0.5 wt %, coloration tends to be too pale.

In a case where the light-colored sintered body exhibits a pink color, such coloration is preferably L*=from 65 to 85, a*=from 0 to 15 and b*=from −10 to 0, more preferably L*=from 70 to 85, a*=from 2 to 12 and b*=from −8 to −0.5.

In a case where the light-colored sintered body exhibits an orange color, such coloration is preferably L*=from 55 to 80, a*=from 0 to 20 and b*=from 30 to 65, more preferably L*=from 60 to 75, a*=from 3 to 18 and b*=from 35 to 65.

In a case where the light-colored sintered body exhibits a lavender color, such coloration is preferably L*=from 55 to 80, a*=from 3 to 15 and b*=from −15 to −3, more preferably L*=from 60 to 80, a*=from 5 to 15 and b*=from −11 to −5.

The deeply colored sintered body contained in the multicolored zirconia sintered body of the present invention is a zirconia sintered body containing a spinel oxide. As it contains a spinel oxide, it becomes a zirconia sintered body having a deeper color tone as compared with the color tone of the light-colored sintered body.

Coloration of the deeply colored sintered body may be a desired color tone, and for example, the value of L* may be lower by at least 20 than the light-colored sintered body. More preferably, L* of the deeply colored sintered body may be exemplified to be less than 55.

In a case where the deeply colored sintered body is a black zirconia sintered body, a preferred spinel oxide to be contained in the deeply colored sintered body may be a spinel oxide containing iron and cobalt, more preferably a spinel oxide containing at least either zinc or aluminum, iron and cobalt, further preferably a spinel oxide containing zinc, aluminum, iron and cobalt. The deeply colored sintered body will thereby exhibit a black color.

As a preferred spinel oxide, a spinel oxide having the following composition may be mentioned.

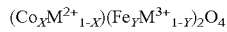

(wherein $M^{2+}$ is at least either Zn or Mn, $M^{3+}$ is at least either Al or Cr, $0.1<X\leq1$, and $0.5<Y\leq1$.)

Further, in order to let a zirconia sintered body exhibit a deeper black color, the spinel oxide is particularly preferably one having the following composition.

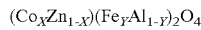

(wherein $0.5<X\leq1$, and $0.5<Y\leq1$.)

The spinel oxide weight to the deeply colored sintered body weight is preferably from 0.25 wt % to 13 wt %, more preferably from 1 wt %/o to 10 wt %/o, further preferably from 3 wt % to 5 wt %. When the spinel oxide is contained within such a range, the color tone of the sintered body becomes more vivid black.

As it contains the above spinel oxide, the deeply colored sintered body exhibits a black color. Coloration of such a zirconia sintered body is, as represented by the L*a*b* color system, preferably L*=from 0 to 10, a*=from −1 to 1 and b*=from −1 to 1, more preferably L*=from 0 to 5, a*=from −0.5 to 0.8 and b*=−0.5 to 0.8. When luminance L* is at most 10, and each of a* and b* is in the vicinity of 0, the deeply colored sintered body becomes a black zirconia sintered body exhibiting pitch black not tinged with red or blue. It is thereby possible to obtain a zirconia sintered body having a higher grade appearance.

In a case where the deeply colored sintered body is a black zirconia sintered body, a preferred spinel oxide to be contained in the black sintered body may be a spinel oxide containing cobalt and aluminum. The deeply colored sintered body thereby becomes a zirconia sintered body exhibiting a blue color.

The content of the spinel oxide containing cobalt and aluminum is preferably from 0.25 wt % to 13 wt %, more preferably from 1 wt % to 10 wt %, further preferably from 3 wt % to 5 wt %, as the spinel oxide weight to the deeply colored sintered body weight. When the content of the spinel oxide is within such a range, the color tone of the sintered body becomes more vivid blue.

As a preferred spinel oxide, $CoAl_2O_4$ may be mentioned.

Further, in the case where the spinel oxide contains cobalt and aluminum, the deeply colored sintered body preferably contains the spinel oxide containing cobalt and aluminum, and a transition metal oxide, and further contains iron oxide ($Fe_2O_3$). The deeply colored sintered body will thereby exhibit a deeper blue color. In order to let the blue color be exhibited, the content of the transition metal oxide is from 0.1 wt % to 2 wt %, preferably from 0.1 wt % to 1 wt %, to the weight of the deeply colored sintered body.

As it contains the above spinel oxide, coloration of the deeply colored sintered body is preferably L*=from 20 to 60, a*=from −20 to 20 and b*=from −70 to −20, more preferably L*=from 30 to 40, a*=from −20 to 15 and b*=−70 to −40, further preferably L*=from 30 to 35, a*=from 0 to 15 and b*=−65 to −60. When L*, a* and b* are within such ranges, the deeply colored sintered body becomes a blue zirconia sintered body exhibiting deep blue not tinged with red. It is thereby possible to obtain a blue zirconia sintered body having a higher grade appearance.

The multicolored zirconia sintered body of the present invention can be produced by a process comprising a primary molding step of molding either one zirconia powder of a zirconia powder containing at least one lanthanoid selected from the group consisting of Ce, Pr, Nd, Eu, Tb, Ho, Er, Yb and Gd, or aluminum oxide, or a zirconia powder containing a spinel oxide, to obtain a primary green body; a secondary molding step of molding the other zirconia powder on the primary green body at a molding temperature lower than the primary molding step, to obtain a secondary green body; a sintering step of firing the secondary green body at a temperature of at least 1,300° C. to obtain a preliminarily sintered body; and a HIP treatment step of subjecting the preliminarily sintered body to hot isostatic pressing (hereinafter referred to as "HIP") treatment at a temperature of from 1,250° C. to 1,650° C. under from 100 MPa to 250 MPa.

In the primary molding step, a primary green body is obtained. The primary green body is either a green body (hereinafter referred to also as a "light-colored green body") obtained by molding a zirconia powder (hereinafter referred to also as a "light-colored powder") containing at least either aluminum oxide or at least one lanthanoid (light-colored lanthanoid) selected from the group consisting of Ce, Pr, Nd, Eu, Tb, Ho, Er, Yb and Gd, or a zirconia green body (hereinafter referred to also as a "deeply colored green body") obtained by molding a zirconia powder (hereinafter referred to also as a "deeply colored powder") containing a spinel oxide.

The molding method in the primary molding step is optional. The molding method may be at least one method selected from the group consisting of press molding, cold isostatic press, casting, sheet molding and injection molding. The molding method is preferably at least either casting or injection molding, whereby a green body having an optional shape can readily be obtainable. More preferably, the molding method is injection molding, whereby a green body with a more complicated and fine shape can readily be obtainable.

In the secondary molding step, on the primary green body made of either one green body of the light-colored green body or the deeply colored green body, a secondary green body made of the other green body, is molded. A green body having the primary green body and the secondary green body bonded to each other, is thereby obtainable.

The molding temperature in the secondary molding step (hereinafter referred to also as the "secondary molding temperature") is preferably set to be at most the molding temperature in the primary molding step (hereinafter referred to also as the "primary molding temperature"). If the secondary molding temperature is higher than the primary molding temperature, distortion, disintegration, etc. tend to occur in the shape of the primary green body, at the time of secondary molding. In such a case, a secondary green body will be obtained which includes such a state that fine shapes of the primary green body, such as convexes, are distorted. If such a secondary green body is sintered, the obtainable multicolored zirconia sintered body will be a sintered body having color bleeding caused by the distortion of the shapes.

In a common molding method comprising primary molding and secondary molding, particularly in casting or injection molding comprising primary molding and secondary molding, the temperature of the primary green body will be raised by the heat of the secondary molding, whereby the temperature of the secondary molding step will be raised. Accordingly, unless the molding temperatures are controlled in the primary molding and the secondary molding, usually the secondary molding temperature exceeds the primary molding temperature. Whereas, in the present invention, the secondary molding temperature is at most the primary molding temperature, preferably less than the primary molding temperature. As the secondary molding temperature is at most the primary molding temperature, i.e. as the primary molding temperature is at least the secondary molding temperature, flow of the pattern and the accompanying color bleeding will not occur. By sintering the secondary green body thus obtained, it is possible to obtain a multicolored zirconia sintered body having no gap or no color bleeding at the interface. Here, flow of the pattern may, for example, be deformation of shapes of the primary green body, such as convexes in the primary green body, by molding for the secondary green body.

In the secondary molding step, as the difference between the primary molding temperature and the secondary molding temperature becomes large, it becomes easier to obtain a secondary green body having no distorted shape. The primary molding temperature may be higher than the secondary molding temperature by at least 3° C., preferably by at least 5° C., more preferably by at least 10° C., further preferably by at least 20° C., still further preferably by at least 30° C. However, in the process of the present invention, when the secondary molding temperature is lower than the primary molding temperature, and the difference is small at a level of from 3 to 30° C., further from 3 to 20° C., more further from 3 to 10° C., still further from 5 to 10° C., it is possible to obtain a secondary green body having no distorted shape with good reproducibility.

The primary molding temperature and the secondary molding temperature may be controlled by the temperature of a molding die for a green body (hereinafter referred to as a "molding die"). That is, in the molding steps, the secondary molding temperature may be set to be at most the primary molding temperature by adjusting the temperature of the molding die for primary molding to be at least the temperature of the molding die for secondary molding, preferably higher than the temperature of the molding die for secondary molding by at least 3° C., preferably by at least 5° C., more preferably by at least 10° C., further preferably by at least 20° C., still further preferably by at least 30° C.

The molding method in the secondary molding step is preferably at least one molding method selected from the group consisting of press molding, cold isostatic press, casting, sheet molding and injection molding, so long as the primary molding temperature and the secondary molding temperature satisfy the above relation. The molding method is preferably at least either casting or injection molding, whereby a green body having an optional shape can readily be obtainable. More preferably, molding in the secondary molding step is injection molding, whereby a green body with a more complicated and fine shape can readily be obtainable.

The injection pressure in injection molding may be exemplified to be from 50 MPa to 150 MPa, preferably from 70 MPa to 130 MPa.

The light-colored powder to be supplied to the primary molding step, the secondary molding step or both of them (hereinafter referred to also as "the molding steps"), is preferably a zirconia powder containing at least either a light-colored lanthanoid or alumina, more preferably a mixed powder of a zirconia powder and at least either powder of a light-colored lanthanoid powder or an alumina powder.

The light-colored powder has a BET specific surface area of preferably from 7 to 20 $m^2/g$, more preferably from 7.5 to 15 $m^2/g$. When the BET specific surface area is within such a range, the light-colored green body tends to have the same sinterable behavior as the deeply colored green body containing a spinel oxide.

The zirconia powder may be a zirconia powder containing 3 mol % of yttria.

In a case where the light-colored powder contains alumina, the content of alumina is such that to the weight of the light-colored powder, the alumina weight is preferably from 0.25 wt % to 20 wt %, more preferably from 1 wt % to 20 wt %, further preferably from 5 wt % to 10 wt %. Here, the alumina powder is preferably an alumina powder having a purity of at least 99%, more preferably a purity of at least 99.5%.

Further, in a case where the light-colored powder contains the above-mentioned light-colored lanthanoid powder, it may contain a very small amount of alumina in addition to the light-colored lanthanoid. In such a case, alumina contained in the light-colored powder is at most 0.5 wt %, preferably at most 0.3 wt %, more preferably at most 0.25 wt %, to zirconia in the light-colored powder.

In a case where the light-colored powder contains the light-colored lanthanoid powder, the content of the lanthanoid is preferably from 0.1 wt % to 6 wt %, more preferably from 0.3 to 3.5 wt %, to the weight of the light-colored powder.

So long as such a powder and the zirconia powder can be uniformly mixed, the mixing method is optional. The mixing method is preferably wet mixing, more preferably ball mill or beads mill mixing. Specifically, mixing such a powder and the zirconia powder in a ball mill for at least 24 hours, may be mentioned.

The deeply colored powder to be supplied to the molding steps is a zirconia powder containing a spinel oxide, and is preferably a mixed powder of a spinel oxide powder and a zirconia powder.

The weight of the spinel oxide powder is preferably from 2 wt % to 6 wt %, more preferably from 2 wt % to 4 wt %, to the weight of the deeply colored powder. Here, the deeply colored powder may be one having a BET specific surface area of from 4 to 10 m²/g.

The zirconia powder may be a zirconia powder containing 3 mol % of yttria.

In a case where the deeply colored powder contains a spinel oxide powder containing iron and cobalt, preferably a spinel oxide powder containing at least either zinc or aluminum, iron and cobalt, more preferably a spinel oxide powder containing zinc, aluminum, iron and cobalt, the spinel oxide powder weight to the deeply colored powder weight is preferably from 0.25 wt % to 13 wt %, more preferably from 1 wt % to 10 wt %, further preferably from 3 wt % to 5 wt %.

As a preferred spinel oxide powder, a spinel oxide powder having the following composition may be mentioned.

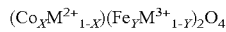

$$(Co_X M^{2+}_{1-X})(Fe_Y M^{3+}_{1-Y})_2 O_4$$

(wherein $M^{2+}$ is at least either Zn or Mn, $M^{3+}$ is at least either Al or Cr, $0.1 < X \leq 1$, and $0.5 < Y \leq 1$.)

Further, in order to obtain a zirconia sintered body exhibiting a deeper black color, the spinel oxide powder is particularly preferably one having the following composition.

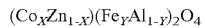

$$(Co_X Zn_{1-X})(Fe_Y Al_{1-Y})_2 O_4$$

(wherein $0.5 < X \leq 1$, and $0.5 < Y \leq 1$.)

The mixing method of the spinel oxide powder and the zirconia powder is optional, but preferably wet mixing, more preferably ball mill mixing. The mixing method may specifically be mixing of the spinel oxide powder and the zirconia powder in a ball mill for at least 24 hours.

In wet mixing, it is preferred to use a solvent such as ethanol. The solvent may be water, etc. in addition to ethanol.

In a case where the deeply colored powder contains a spinel oxide powder containing cobalt and aluminum and further a $CoAl_2O_4$ powder, the spinel oxide weight to the deeply colored powder weight is preferably from 0.25 wt % to 13 wt %, more preferably from 1 wt % to 10 wt %, further preferably from 3 wt % to 5 wt %.

Further, in addition to the spinel oxide powder, a transition metal oxide powder and further, an iron oxide powder, may be contained. The content of the transition metal oxide powder is from 0.1 wt % to 2 wt %, preferably from 0.1 wt % to 1 wt %.

In the molding step, in order to improve the flowability of the powder, at least either the light-colored powder or the deeply colored powder preferably contains an organic binder.

In a case where an organic binder is contained, the content of the organic binder in each zirconia powder is preferably from 25 to 65 vol %, more preferably from 35 to 60 vol %.

The organic binder may, for example, be at least one member selected from the group consisting of an acrylic resin, a polyolefin resin, a wax and a plasticizer, and the organic binder preferably contains at least an acrylic resin.

So long as the zirconia powder and the organic binder can be mixed uniformly, the mixing method is optional. As the mixing method, heat kneading or wet mixing may be exemplified.

The light-colored green body and the deeply colored green body are preferably in agreement in sintering shrinkage behavior, whereby no distortion due to a difference in shrinkage will occur, and the green bodies can be sintered in such a state that both are strongly bonded to each other. For example, to the shrinkage degree of the black zirconia sintered body to the black zirconia green body, the ratio (hereinafter referred to also as "the shrinkage degree ratio") of the similar shrinkage degree with respect to white zirconia, may be from 0.95 to 1.05, when the sintering temperature is 1,200° C.

In the firing step, the secondary green body is fired for preliminary sintering to obtain a preliminarily sintered body.

In the firing step, the firing temperature is at least 1,300° C., preferably at least 1,350° C. If the firing temperature is lower than 1,300° C., in the HIP treatment step, the sintered body tends not to be densified. The firing temperature is not required to be higher than required, and is usually from 1,300° C. to 1,550° C., preferably from 1,350° C. to 1,500° C., further preferably from 1,350 to 1,450° C.

The firing atmosphere may be any one of the air atmosphere, an inert atmosphere or vacuum, preferably either the air atmosphere or an inert atmosphere, more preferably the air atmosphere. The above firing temperature and firing atmosphere may be optionally combined for use.

The firing step is preferably pressureless sintering i.e. a method of sintering simply by heating without exerting an external force to the green body.

The firing time varies depending upon the firing temperature, but is preferably at least 1 hour, more preferably at least 2 hours. When the firing time is at least 1 hour, removal of a gap will be promoted in the firing step. On the other hand, the firing time is preferably at most 5 hours, more preferably at most 3 hours.

Further, in a case where a green body is formed from a zirconia powder containing an organic binder, it is preferred to conduct degreasing treatment to remove the organic binder from the green body before the firing treatment.

The firing temperature in the degreasing treatment is preferably from 400° C. to 600° C. Here, the atmosphere for the degreasing treatment is preferably any atmosphere selected from the air atmosphere, an inert gas atmosphere and an oxidized gas atmosphere.

In the production process of the present invention, the preliminarily sintered body is subjected to HIP treatment, whereby removal of a gap at the interface is promoted while suppressing color bleeding at the interface, and the preliminarily sintered body is sintered, to obtain a multicolored zirconia sintered product of the present invention.

In the HIP treatment, the HIP temperature is preferably at least 1,200° C., more preferably at least 1,250° C., further preferably at least 1,300° C., still further preferably 1,350° C. So long as densification proceeds, the HIP temperature is not required to be higher than required. The HIP temperature is preferably at most 1,650° C., more preferably at most 1,450° C.

The HIP pressure may be at least 50 MPa, preferably at least 100 MPa, more preferably at least 140 MPa. In HIP treatment using a common HIP treatment apparatus, the HIP pressure is at most 250 MPa, preferably at most 180 MPa.

The atmosphere for the HIP treatment may be an inert atmosphere. At least either a nitrogen atmosphere or an argon atmosphere may be mentioned, and an argon atmosphere is preferred. The above mentioned HIP temperature, HIP pressure and atmosphere, and their upper and lower limit numerical values, may be optionally combined for use.

By the production process of the present invention, it is possible to obtain a multicolored zirconia sintered body having no color bleeding or no gap at the interface.

Further, the production process of the present invention may further include either a processing step or a polishing step (hereinafter referred to also as a "post treatment step") to process the obtained multicolored zirconia sintered body into various members.

In the processing step, the multicolored zirconia sintered body obtained by the HIP treatment is processed to have a desired shape. As the processing method, an optional method may be employed. The processing method is preferably a common cutting work and may be at least one type selected from the group consisting of lathe work, surface grinding, R grinding and NC machining (numerical control machining).

In the polishing step, the multicolored zirconia sintered body obtained by the HIP treatment or one having it process-treated, is polished, whereby glossiness may be improved, and the high grade appearance of the multicolored zirconia sintered body may be enhanced. The polishing method is optional, but at least either barrel polishing or R polishing may be exemplified.

In the production process of the present invention, it is possible to select an optional combination of the above-mentioned respective conditions in the primary molding step, the secondary molding step, the firing step, the HIP treatment step and the post treatment step.

EXAMPLES

Now, the present invention will be described in detail with reference to Examples and Comparative Examples. However, the present invention is by no means limited thereto.
(Sintered Body Density and Relative Density)

The measured density (sintered body density) of a multicolored zirconia sintered body is one measured by the Archimedes method.

The relative density of the multicolored zirconia sintered body was calculated by the above-mentioned formula (1) from the obtained measured density and the theoretical density.

Further, the theoretical density of the multicolored zirconia sintered body was calculated by the above-mentioned formula (1').

The calculated theoretical densities of multicolored zirconia sintered bodies in Examples and Comparative Examples are, respectively, shown in Tables 2, 5, 7, 9, 11 and 13.
(Specific Surface Area)

The BET specific surface area by nitrogen adsorption was measured and taken as the specific surface area of the powder sample. For the measurement, a specific surface area measuring apparatus (manufactured by Quantachrome Instruments) was used.
(Optical Microscopic Observation)

Using an optical microscope (trade name: MM-800, manufactured by Nikon Corporation) or a trinocular stereo zoom microscope (trade name: AR-372ZH, ARMSSYS-TEM Co., Ltd), the interface of a sintered body sample was observed. By the optical microscopic observation, the presence or absence of a gap and presence or absence of color bleeding at the interface were observed.
(SEM Observation)

Using SEM (trade name: JSM-5400, manufactured by JEOL Ltd.), the interface of a sintered body sample was observed. By the SEM observation, the magnification was set at 500-fold magnification, and the presence or absence of a gap at the interface was observed.
(Element Quantitative Analysis by EPMA)

Using a wavelength dispersive electron probe micro analyzer (EPMA) (trade name: EPMA1610, manufactured by Shimadzu Corporation), a point analysis in the vicinity of the interface of a light-colored sintered body in a sintered body sample, was carried out. The measurement conditions were as follows.

| | |
|---|---|
| Acceleration voltage: | 15 KV |
| Irradiation current: | 100 nA |
| Analytical range: | φ10 μm |

The measurement was made at a region of a light-colored sintered body with a distance of 30 μm, 50 μm, 100 μm, 130 μm, 170 μm or 200 μm from the interface, and the measured region where a coloring component was confirmed, which was most distanced from the interface, was taken as the migration region.
(Color Tone by L*a*b* Color System)

In accordance with JIS Z8722, the color tone of a sintered body was measured. For the measurement, a color difference meter (trade name: Color Analyzer TC-1800MK-II, manufactured by Tokyo Denshoku Co., Ltd.) was used. The measurement conditions were as follows.

| | |
|---|---|
| Light source: | D65 light source |
| Viewing angle: | 2° |

The sample of a sintered body was in the form of a disk having a thickness of 1 mm and a diameter of 20 mm and having both surfaces polished.
(Mechanical Strength Test)

As mechanical strength of a multicolored zirconia sintered body sample, an impact strength was measured by a steel ball drop test in accordance with ISO14368-3. That is, on a plate made of SUS, a multicolored zirconia sintered body sample was placed. Thereafter, an iron ball having a weight of 16 g was dropped to the vicinity of the interface between the light-colored sintered body and the deeply colored sintered body, from a height of 5 cm from the multicolored zirconia sintered body, whereby the presence or absence of cracking, cleavage, breaking or other damages of the multicolored zirconia sintered body was confirmed. Thereafter, by adjusting the drop starting position of the iron ball (hereinafter referred to also as "ball dropping position") to be higher by intervals of 5 cm, similar measurements were made. The ball dropping position (cm) where breakage of the multicolored zirconia sintered body was confirmed, was taken as the impact strength of the multicolored zirconia sintered body.

Example 1

A multicolored zirconia sintered body composed of a white zirconia sintered body and a black zirconia sintered body, and a bezel ring for a timepiece (hereinafter also referred to simply as a "bezel ring") made of such a multicolored zirconia sintered body, were prepared.
(Preparation of White Zirconia Material)

High purity aluminum oxide (purity: 99.9%) was added to a zirconia powder containing yttria and having a BET specific surface area of 8 m$^2$/g, so that the weight of alumina (hereinafter also referred to simply as "alumina weight")

would be 5 wt % to the total weight of yttria and zirconia in the zirconia powder containing 3 mol % of yttria (trade name: TZ-3YS, manufactured by Tosoh Corporation).

After the addition, using balls made of zirconia and having a diameter of 10 mm, these powders were mixed in a ball mill for 24 hours in an ethanol solvent. The powder after mixing, was dried to obtain a white zirconia powder.

To the obtained white zirconia powder, an acryl binder was mixed, and the mixture was designated as a white zirconia material. The content of the white zirconia powder in the white zirconia material was 45 vol %.

(Preparation of Black Zirconia Material)

A commercially available black zirconia powder (trade name: TZ-Black, manufactured by Tosoh Corporation) was used as a black zirconia powder. This powder is a powder comprising zirconia containing 3 mol % of yttria and a spinel oxide having the following composition and containing iron and cobalt, wherein a part of cobalt is substituted by Zn, and a part of iron is substituted by Al. Here, the content of the spinel oxide in the black zirconia powder is 3.5 wt %.

$$(Co_{0.7}Zn_{0.3})(Fe_{0.7}Al_{0.3})_2O_4$$

To the above black zirconia powder, an acryl binder was mixed, and the mixture was designated as a black zirconia material. Here, the content of a black zirconia powder in the black zirconia material was 45 vol %.

(Preparation of Secondary Green Body)

The white zirconia material was injection-molded to obtain a bezel ring-shaped white zirconia green body having convexes. The conditions for the Injection molding were such that the temperature of the molding die for injection molding was 60° C., and the pressure was 100 MPa.

Then, on the obtained white zirconia green body, the black zirconia material was injection-molded. A secondary green body was thereby obtained wherein the white zirconia green body and the black zirconia green body were bonded in such a form that the latter was laminated on the former. The temperature of the molding die for the secondary molding was set to be 50° C., whereby the primary molding temperature was higher by 10° C. than the secondary molding temperature.

The obtained green body was subjected to degreasing treatment in the atmospheric air at a temperature-raising rate of 2.0° C./hr at a degreasing temperature of 450° C. and for a degreasing time of 4 hours.

(Firing and HIP Treatment)

The green body after the degreasing treatment was fired in the atmospheric air at a temperature-raising rate of 100° C./hr at a firing temperature of 1,450° C. and for a firing time of 2 hours, to obtain a primary sintered body.

The obtained primary sintered body was placed in an alumina container and then, subjected to HIP treatment in an atmosphere of argon gas with a purity of 99.9%, at a HIP temperature of 1,350° C. under a HIP pressure of 150 MPa and for a retention time of 1 hour, to obtain a HIP treated product. The obtained HIP treated product was designated as a white/black zirconia sintered body. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 99.7%.

(Processing into Member)

The surface of the black zirconia sintered body side of the white/black zirconia sintered body obtained as described above, was processed until the convexes of the white zirconia sintered body became clearly confirmed. Thus, the white/black zirconia sintered body was made into a bezel ring having a pattern of the white zirconia sintered body on the same surface as the black zirconia sintered body. The bezel ring after the surface processing, was subjected to polishing treatment to obtain a bezel ring having high glossiness.

The obtained bezel ring was in a ring shape having an outer diameter of 40 mm, an inner diameter of 30 mm and a width of 5 mm. Further, the thickness was 2 mm.

Figure 13:
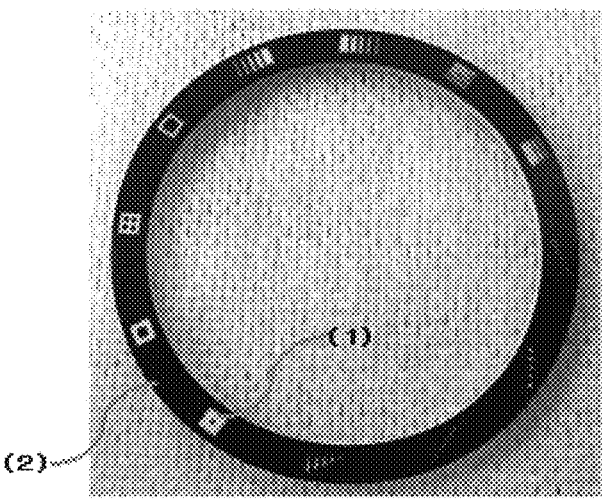
FIG. 13 is an outer appearance of the bezel ring in Example 1.
Figure 14:
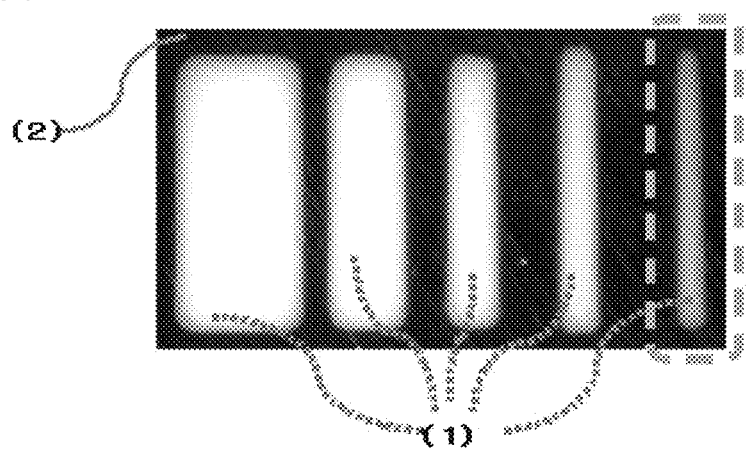
FIG. 14 is an optical micrograph of the pattern of the white/black zirconia sintered body in Example 1.

The outer appearance of the bezel ring is shown in FIG. 13, an optical micrograph of the interface is shown in FIG. 4, and an optical micrograph having the pattern further enlarged, is shown in FIG. 14.

As shown in FIG. 13, the above bezel ring has a surface made of the black zirconia sintered body, and further has a pattern made of the white zirconia sintered body, on the same surface. Further, from FIG. 4, the interface was confirmed to have no blurring of white color or no color bleeding. Further, from FIG. 14, it was confirmed that since there was no color bleeding, a line pattern with a thickness of 0.15 mm was formed as a clear pattern (the dashed rectangular portion in FIG. 14).

(Evaluations)

A result of an optical microscopic observation of the above bezel ring is shown in FIG. 1. It was found that the white zirconia and the black zirconia were sintered to form an interface, and the interface had no gap (e.g. the dashed oblong portion in FIG. 1).

Further, a secondary electron image of the bezel ring is shown in FIG. 2. Also in the secondary electron image, the interface was confirmed (the portion indicated by arrows in FIG. 2). Further, it was confirmed that no gap was formed at the interface, and there was no bonding layer.

From these results, it was confirmed that the white/black zirconia sintered body and the bezel ring obtained as described above, had no gap at the interface.

Further, EPMA analyses of the interface of the bezel ring and the vicinity of the interface were conducted. The results are shown in Table 3. In the white zirconia sintered body, iron element being a coloring component of the black zirconia sintered body, was confirmed in a region within 100 μm from the interface. On the other hand, cobalt element being a coloring component of the black zirconia sintered body was not confirmed even in a region within 30 μm from the interface. Thus, it was confirmed that in the white/black zirconia sintered body obtained as described above, the migration region of iron was a region within 100 μm from the interface, and there was no migration region of cobalt.

It was confirmed that the white/black zirconia sintered body and the bezel ring obtained as described above, had no color bleeding or no gap at the interface, despite that a very small amount of Fe was contained in the white zirconia sintered body.

Further, the obtained bezel ring was subjected to a mechanical strength test. Even when an iron ball was dropped thereon from a height of 85 cm, no breakage or cleavage occurred. Thus, it was confirmed that the white/black zirconia sintered body obtained as described above had a high strength with an impact strength being at least 85 cm.

Example 2

A white/black zirconia sintered body was obtained by conducting molding, firing and HIP treatment in the same manner as in Example 1 except that by adding the high purity aluminum oxide adjusting 10 wt % as alumina weight, the firing temperature was changed to be 1,500° C., and the HIP treatment temperature was changed to be 1,450° C. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 99.6%.

Then, in the same manner as in Example 1, the obtained white/black zirconia sintered body was processed and subjected to polishing treatment, to obtain a bezel ring having high glossiness.

The obtained bezel ring had a surface made of the black zirconia sintered body and further had a patter made of the white zirconia sintered body, on the same surface.

The interface of the bezel ring was visually observed, and as a result, it was confirmed that the interface had no blurring of white color and no color bleeding.

Further, the interface of the bezel ring was observed by an optical microscope and SEM observation. As a result, it was confirmed that the white zirconia and the black zirconia were sintered to form an interface, the interface had no gap despite that it had a curvature, and there was no bonding layer.

Further, the bezel ring was subjected to a mechanical strength test. Even when an Iron ball was dropped thereon from a height of 85 cm, no breakage or cleavage occurred. Thus, it was confirmed that the white/black zirconia sintered body obtained as described above, had a high strength with an impact strength of at least 85 cm.

Example 3

A white/black zirconia sintered body was obtained by conducting molding, firing and HIP treatment in the same manner as in Example 1 except that a zirconia powder having a BET specific surface area of 15 m$^2$/g and containing 3 mol % of yttria (trade name: TZ-3Y, manufactured by Tosoh Corporation), was used, by adding the high purity aluminum oxide adjusting 10 wt % as alumina weight, the firing temperature was changed to be 1,500° C., and the HIP treatment temperature was changed to be 1,450° C. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 99.6%.

Then, in the same manner as in Example 1, the obtained white/black zirconia sintered body was processed and subjected to polishing treatment, to obtain a bezel ring having high glossiness.

The obtained bezel ring had a surface made of the black zirconia sintered body and further had a pattern made of the white zirconia sintered body, on the same surface.

The interface of the bezel ring was visually observed, and as a result, it was confirmed that the interface had no blurring of white color and no color bleeding.

Further, the interface of the bezel ring was observed by an optical microscope and SEM observation. As a result, it was confirmed that the white zirconia and the black zirconia were sintered to form an Interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the white/black zirconia sintered body obtained as described above, had a high strength with an impact strength of at least 85 cm.

Example 4

A white/black zirconia sintered body was obtained by conducting molding, firing and HIP treatment in the same manner as in Example 1 except that a zirconia powder having a BET specific surface area of 15 m$^2$/g and containing 3 mol % of yttria (trade name: TZ-3Y, manufactured by Tosoh Corporation), was used, and the firing temperature was changed to be 1,400° C. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 99.7%.

Then, in the same manner as in Example 1, the obtained white/black zirconia sintered body was processed and subjected to polishing treatment, to obtain a bezel ring having high glossiness.

The obtained bezel ring had a surface made of the black zirconia sintered body and further had a pattern made of the white zirconia sintered body, on the same surface.

The interface of the bezel ring was visually observed, and as a result, it was confirmed that the interface had no blurring of white color and no color bleeding.

Further, the interface of the bezel ring was observed by an optical microscope and SEM observation. As a result, it was confirmed that the white zirconia and the black zirconia were sintered to form an interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the white/black zirconia sintered body obtained as described above, had a high strength with an impact strength of at least 85 cm.

Example 5

A white/black zirconia sintered body was obtained by conducting molding, firing and HIP treatment in the same manner as in Example 1 except that a zirconia powder having a BET specific surface area of 15 m$^2$/g and containing 3 mol % of yttria was used, and the firing temperature was changed to be 1,350° C. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 99.7%.

Then, in the same manner as in Example 1, the obtained white/black zirconia sintered body was processed and subjected to polishing treatment, to obtain a bezel ring having high glossiness.

The obtained bezel ring had a surface made of the black zirconia sintered body and further had a pattern made of the white zirconia sintered body, on the same surface.

The interface of the bezel ring was visually observed, and as a result, it was confirmed that the interface had no blurring of white color and no color bleeding.

Further, the interface of the bezel ring was observed by an optical microscope and SEM observation. As a result, it was confirmed that the white zirconia and the black zirconia were sintered to form an interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the white/black zirconia sintered body obtained as described above, had a high strength with an impact strength of at least 85 cm.

Comparative Example 1

A white/black zirconia sintered body was obtained by conducting molding and firing in the same manner as in Example 1 except that no HIP treatment was conducted. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 98.8%.

Then, in the same manner as in Example 1, the obtained white/black zirconia sintered body was processed and subjected to polishing treatment, to obtain a bezel ring.

The obtained bezel ring had a surface made of the black zirconia sintered body and further had a pattern made of the white zirconia sintered body, on the same surface.

Further, the interface of the bezel ring was visually observed, and as a result, it was confirmed that the interface had no blurring of white color and no color bleeding.

Figure 15:
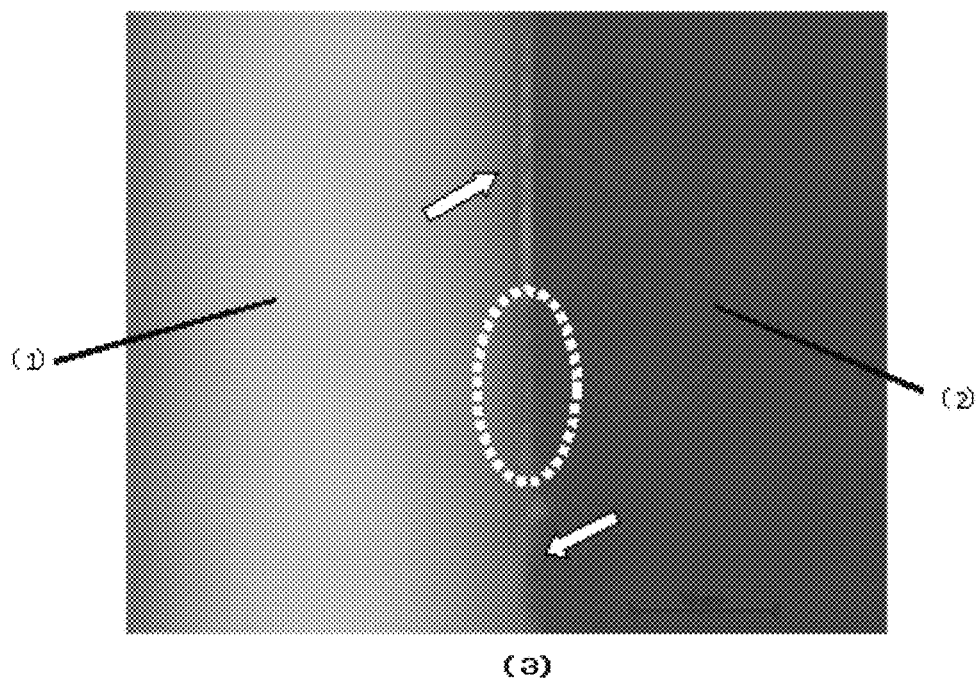
FIG. 15 is an optical micrograph (the scale in the Fig. is 10 μm) of the interface of the white/black zirconia sintered body in Comparative Example 1.

A result of an optical microscopic observation of the interface of the bezel ring is shown in FIG. 15. From FIG. 15, the white/black zirconia sintered body was confirmed to have an interface (the dashed oblong portion in FIG. 15). Further, the interface was confirmed to have gaps (the portions indicated by arrows in FIG. 15).

Further, a reflection electron image of the interface of the bezel ring is shown in FIG. 3. Also from FIG. 3, the white/black zirconia sintered body can be confirmed to have an Interface (the dashed oblong portion in FIG. 3). However, as shown by an arrow in FIG. 3, it was confirmed that at the interface, a gap with a width of about 5 μm was formed in a range of at least 100 μm (the portion indicated by an arrow in FIG. 3).

From these results, it was confirmed that of the white/black zirconia sintered body obtained as described above, the interface had a gap, and there was no color bleeding since the interface was present.

Further, the obtained bezel ring was subjected to a mechanical strength test. When an iron ball was dropped thereon from a height of 10 cm, the white/black zirconia sintered body was broken. Thus, it was confirmed that the white/black zirconia sintered body obtained as described above, was poor in mechanical strength with an impact strength of less than 10 cm.

Comparative Example 2

A white/black zirconia sintered body was obtained by conducting molding and firing in the same manner as in Example 1 except that instead of the high purity aluminum oxide, high purity silica was used, the high purity silica (trade name: 1-FX, manufactured by Takimori Co., Ltd.) was added so that the weight of silica would be 5 wt % to the total weight of yttria and zirconia in the zirconia powder containing 3 mol % of yttria, and no HIP treatment was conducted.

The obtained white/black zirconia sintered body was visually observed, and as a result, it was confirmed that the sintered body had a crack started from a gap at the interface, and many other cracks, and the sintered body was broken. Therefore, no HIP treatment was conducted. The production conditions of the sintered body are shown in Table 1, and the evaluation results are shown in Table 2. Here, since the obtained white/black zirconia sintered body was broken, it was not possible to conduct measurement of the relative density.

Further, a part of the broken sintered body was recovered, and the surface on the black zirconia sintered body side, of the part of the white/black zirconia sintered body, was processed until the convexes of the white zirconia sintered body was clearly confirmed. The white/black zirconia sintered body after the processing was visually observed, whereby the color tone of the white zirconia sintered body in the vicinity of the interface was bleeding, and the pattern formed by the white zirconia sintered body was a blurred one. Thus, it was confirmed that the sintered body had color bleeding at the interface.

Comparative Example 3

A white/black zirconia sintered body was obtained by conducting molding and firing in the same manner as in Example 1 except that the high purity aluminum oxide and a high purity zinc oxide powder (trade name: special grade zinc oxide, manufactured by Kishida Chemical Co., Ltd.) were used, the zinc oxide powder was added so that the weight of zinc oxide would be 1 wt % to the total weight of yttria and zirconia in the zirconia powder containing 3 mol % of yttria, and no HIP treatment was conducted. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 98.8%.

Then, in the same manner as in Example 1, the obtained white/black zirconia sintered body was processed and subjected to polishing treatment, to obtain a bezel ring.

Optical microscopic observation and SEM observation of the interface of the obtained bezel ring were conducted, and as a result, it was confirmed that the white zirconia and the black zirconia were sintered to form an interface, and the interface had gaps.

The interface of the bezel ring was visually observed, and as a result, it was confirmed that the interface had blurring of white color and color bleeding.

Further, a result of an optical microscopic observation of the interface of the bezel ring is shown in FIG. 5. From FIG. 5, it was confirmed that since the color was gradually changed in the vicinity of the interface of the white zirconia sintered body, there was no distinct interface (the dashed rectangular portion in FIG. 5).

Further, an EPMA analysis of the vicinity of the interface of the bezel ring was conducted. The results are shown in Table 3. In the white zirconia sintered body, iron element being a coloring component of the black zirconia sintered body was confirmed in a region within 130 μm from the interface. Further, cobalt element being a coloring component of the black zirconia sintered body was confirmed in a region within 50 μm from the interface. Thus, it was confirmed that the migration region of iron was a region within 130 μm, and the migration region of cobalt was a region within 50 μm from the interface.

Further, iron element and cobalt element were each at a concentration exceeding 1 wt % in a region within 30 μm from the interface. Thus, iron element and cobalt element in this region are considered to be one of causes for color bleeding.

Comparative Example 4

A white/black zirconia sintered body was obtained by conducting molding, firing and HIP treatment in the same manner as in Example 1 except that the temperature of the molding die for injection molding at the time of injection molding the white zirconia material was adjusted to 50° C., and the molding temperature at the time of injection molding the black zirconia material was not controlled. The temperature of the molding die for injection molding at the time of injection molding the black zirconia material was 60° C. The production conditions are shown in Table 1, and the evaluation results are shown in Table 2.

Of the obtained white/black zirconia sintered body, the volume ratio of the white zirconia sintered body to the black zirconia sintered body was 41:59, and the relative density was 99.7%.

Then, in the same manner as in Example 1, the obtained white/black zirconia sintered body was processed and subjected to polishing treatment, to obtain a bezel ring.

The obtained bezel ring had a surface made of the black zirconia sintered body and further had a pattern made of the white zirconia sintered body, on the same surface.

The interface of the bezel ring was visually observed, and as a result, it was confirmed that the interface of the pattern made of the white zirconia sintered body had blurring of white color and color bleeding.

Figure 16:
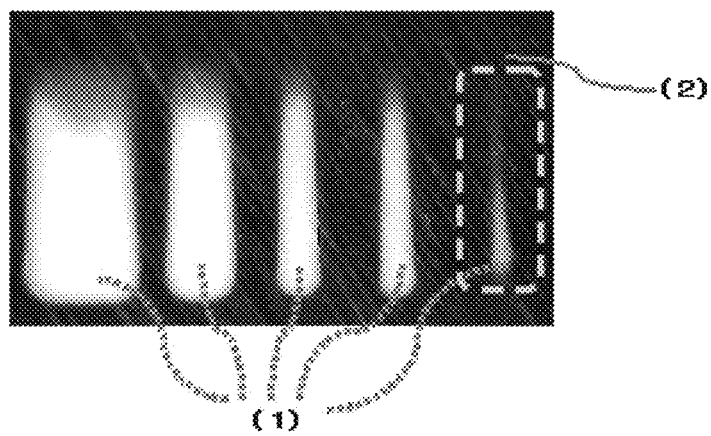
FIG. 16 is an optical micrograph of the pattern of the white/black zirconia sintered body in Comparative Example 4.

An optical micrograph of the interface of the bezel ring is shown in FIG. 16. From FIG. 16, it was confirmed that the pattern made of a line pattern formed by the white zirconia sintered body was gradually disappeared by color bleeding, and the line pattern having a thickness of 0.15 mm made of the white zirconia sintered body was disappeared in the middle (the dashed rectangular portion in FIG. 16).

TABLE 1

| | White zirconia powder | | | | | Black zirconia powder | Firing temperature (° C.) | HIP treatment (° C., MPa) |
|---|---|---|---|---|---|---|---|---|
| | Amount of $Y_2O_3$ (mol %) | Amount of $Al_2O_3$ (wt %) | Amount of $SiO_2$ (wt %) | Amount of ZnO (wt %) | Specific surface area ($m^2$g) | | | |
| Example 1 | 3 | 5 | 0 | 0 | 8 | TZ-Black | 1,450 | 1,350, 150 |
| Example 2 | 3 | 10 | 0 | 0 | 8 | | 1,500 | 1,450, 150 |
| Example 3 | 3 | 10 | 0 | 0 | 15 | | 1,500 | 1,450, 150 |
| Example 4 | 3 | 5 | 0 | 0 | 15 | | 1,400 | 1,350, 150 |
| Example 5 | 3 | 5 | 0 | 0 | 15 | | 1,350 | 1,350, 150 |
| Comparative Example 1 | 3 | 5 | 0 | 0 | 8 | | 1,450 | — |
| Comparative Example 2 | 3 | 0 | 5 | 0 | 8 | | 1,450 | — |
| Comparative Example 3 | 3 | 5 | 0 | 1 | 8 | | 1,450 | — |
| Comparative Example 4 | 3 | 5 | 0 | 0 | 8 | | 1,450 | 1,350, 150 |

*In the Table, "—" represent "not measured".

TABLE 2

| | White/black zirconia sintered body | | | Firing shrinkage degree in diametrical direction (%) | Color tone of white zirconia sintered body | | |
|---|---|---|---|---|---|---|---|
| | Theoretical density (g/cm$^3$) | Relative density (%) | Presence or absence of gap at interface | | L* | a* | b* |
| Example 1 | 6.00 | 99.7 | Absent | 80.10 | 86.15 | −0.47 | 0.98 |
| Example 2 | 5.94 | 99.6 | Absent | 80.27 | 88.24 | −0.62 | 1.24 |
| Example 3 | 5.94 | 99.6 | Absent | 80.22 | 88.55 | −0.68 | 1.15 |
| Example 4 | 6.00 | 99.7 | Absent | 79.74 | 88.42 | −0.55 | 0.96 |
| Example 5 | 6.00 | 99.7 | Absent | 79.74 | 90.35 | −0.88 | 1.02 |
| Comparative Example 1 | 6.00 | 98.8 | Present | 80.10 | 87.27 | −0.58 | 0.57 |
| Comparative Example 2 | 5.90 | — | Present | 80.35 | 85.42 | −0.55 | 0.76 |
| Comparative Example 3 | 6.00 | 98.8 | Present | 79.84 | 91.84 | −0.45 | 1.14 |
| Comparative Example 4 | 6.00 | 99.7 | Absent | — | — | — | — |

*In the Table, "—" represent "not measured".

TABLE 3

| | Fe concentration in white zirconia sintered body (wt %) | | | | | | Co concentration in white zirconia sintered body (wt %) | | |
|---|---|---|---|---|---|---|---|---|---|
| | Distance from interface (μm) | | | | | | | | |
| | 30 | 50 | 100 | 130 | 170 | 200 | 30 | 50 | 100 |
| Example 1 | 0.5 | 0.6 | 0.3 | 0 | 0 | 0 | 0 | 0 | 0 |
| Comparative Example 3 | 1.3 | 0.6 | 0.2 | 0.3 | 0 | 0 | 1.4 | 0.5 | 0 |

Example 6

A bezel ring for a timepiece made of a white zirconia sintered body and a black zirconia sintered body was prepared.

(Preparation of White Zirconia Material)

High purity aluminum oxide (purity: 99.9%) was added to a zirconia powder containing yttria and having a BET specific surface area of 15 m²/g (trade name: TZ-3Y, manufactured by Tosoh Corporation), so that the weight of alumina would be 5 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a white zirconia powder.

To the obtained white zirconia powder, an acryl binder was mixed, and the mixture was designated as a white zirconia material. The content of the white zirconia powder in the white zirconia material was 45 vol %.

(Preparation of Black Zirconia Material)

A commercially available black zirconia powder (trade name: TZ-Black, manufactured by Tosoh Corporation) was used as a black zirconia powder. This powder is a powder comprising zirconia containing 3 mol % of yttria and a spinel oxide powder having the following composition and containing iron and cobalt, wherein a part of cobalt is substituted by Zn, and a part of iron is substituted by Al. Here, the content of the spinel oxide is 3.5 wt %.

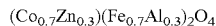

$(Co_{0.7}Zn_{0.3})(Fe_{0.7}Al_{0.3})_2O_4$

To the above black zirconia powder, an acryl binder was mixed, and the mixture was designated as a black zirconia material. Here, the content of a white zirconia powder in the black zirconia material was 45 vol %.

(Preparation of Green Body)

The white zirconia material was injection-molded to obtain a bezel ring-shaped white zirconia green body having convexes. The temperature of the molding die for injection molding was 65° C., and the pressure for injection molding was 100 MPa.

Then, on the obtained white zirconia green body, the black zirconia material was injection-molded. The pressure for Injection molding was 100 MPa, and the temperature of the molding die for the molding was set to be lower by 15° C. than the temperature of the molding die for injection molding of the white zirconia material. Thus, a green body was obtained wherein the white zirconia green body and the black zirconia green body were bonded in such a form that the latter was laminated on the former.

The obtained green body was subjected to degreasing treatment in the atmospheric air at a temperature-raising rate of 2.0° C./hr at a degreasing temperature of 450° C. and for a degreasing time of 4 hours.

(Firing and HIP Treatment)

The green body after the degreasing treatment was fired in the atmospheric air at a temperature-raising rate of 100° C./hr at a firing temperature of 1,400° C. and for a firing time of 2 hours, to obtain a preliminarily sintered body.

The obtained preliminarily sintered body was placed in an alumina container and then, subjected to HIP treatment in an atmosphere of argon gas with a purity of 99.9%, at a HIP temperature of 1,350° C. under a HIP pressure of 150 MPa and for a retention time of 1 hour, to obtain a HIP treated product. The obtained HIP treated product was designated as a white/black zirconia sintered body. The production conditions are shown in Table 4, and the evaluation results are shown in Table 5.

Of the obtained white/black zirconia sintered body, the volume ratio of the white zirconia sintered body to the black zirconia sintered body was 41:59, and the relative density was 99.7%.

(Processing into Member)

The surface on the black zirconia sintered body side of the white/black zirconia sintered body obtained as described above, was processed until the convexes of the white zirconia sintered body became clearly confirmed. Thus, the white/black zirconia sintered body was made into a bezel ring having a pattern of the white zirconia sintered body on the same surface as the black zirconia sintered body. The bezel ring after the surface processing, was subjected to polishing treatment to obtain a bezel ring having high glossiness.

The obtained bezel ring had a surface made of the black zirconia sintered body, and further had a pattern made of the white zirconia sintered body, on the same surface. Further, the interface of the bezel ring was visually observed, whereby the interface was confirmed to have no blurring of white color or no color bleeding.

(Evaluations)

Figure 17:
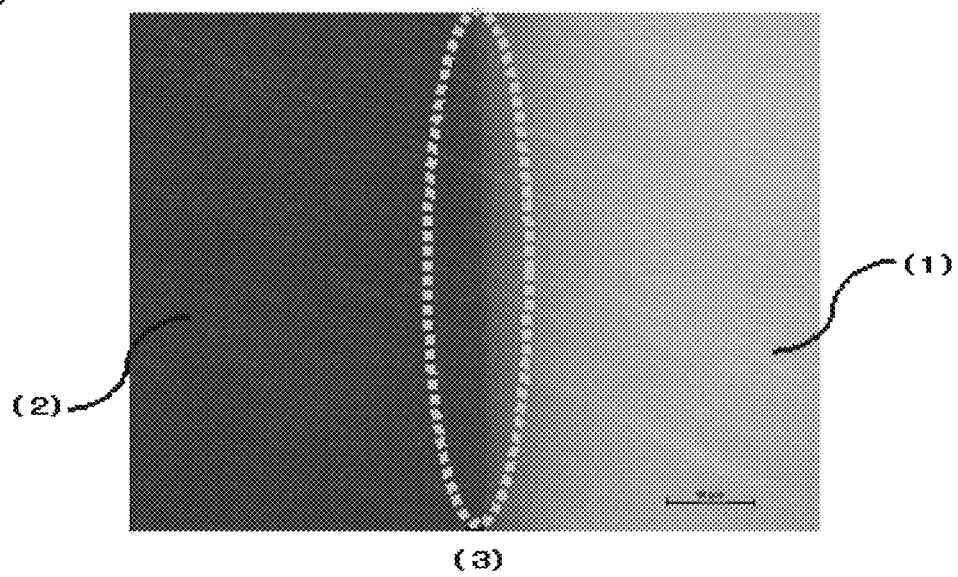
FIG. 17 is an optical micrograph (the scale in the Fig. is 10 μm) of the interface of the white/black zirconia sintered body in Example 6.

A result of an optical microscopic observation of the interface of the above bezel ring is shown in FIG. 17. It was found that the white zirconia and the black zirconia were sintered to form an interface, and the interface had no gap (e.g. the dashed oblong portion in FIG. 17).

Figure 18:
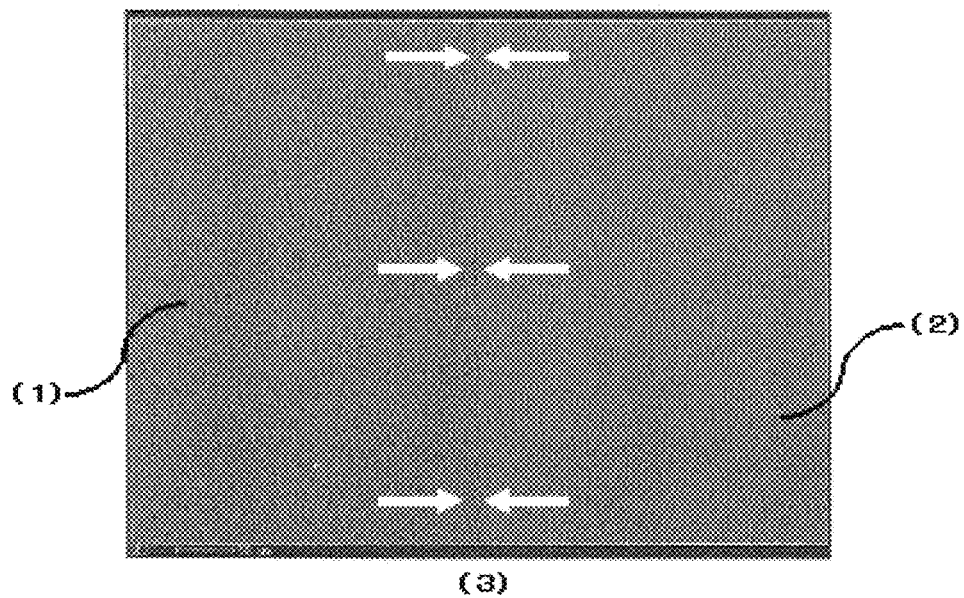
FIG. 18 is a secondary electron image (the scale in the Fig. is 50 μm) of the interface of the white/black zirconia sintered body in Example 6.

Further, a secondary electron image of the interface of the bezel ring is shown in FIG. 18. Also in the reflection electron image, the interface was confirmed (the portion indicated by arrows in FIG. 18). Further, it was confirmed that no gap was formed at the interface, and there was no bonding layer.

From these results, it was confirmed that the white/black zirconia sintered body and the bezel ring obtained as described above, had no gap at the interface.

Further, EPMA analyses of the interface of the bezel ring and the vicinity of the interface were conducted. The results are shown in Table 3. Iron element was confirmed in a region within 50 μm from the interface of the white zirconia sintered body, but in a region within 100 μm from the interface, iron element being a coloring component of the black zirconia sintered body, was not confirmed. Further, cobalt element was not confirmed even in a region within 30 μm from the interface. From these results, it was confirmed that in the white/black zirconia sintered body obtained as described above, the migration region of iron was a region within 50 μm from the interface, and there was no migration region of cobalt. Further, the Fe concentration in the vicinity of the interface was 0.5 wt %.

It was confirmed that the white/black zirconia sintered body and the bezel ring obtained as described above, had no color bleeding or no gap at the interface, despite that a very small amount of Fe was contained in the white zirconia sintered body.

Further, the obtained bezel ring was subjected to a mechanical strength test. Even when an iron ball was dropped thereon from a height of 85 cm, no breakage or cleavage occurred. Thus, it was confirmed that the white/black zirconia sintered body obtained as described above had a high strength with an impact strength being at least 85 cm.

Example 7

A white/black zirconia sintered body was obtained by conducting molding, firing and HIP treatment in the same manner as in Example 6 except that the firing temperature was changed to be 1,350° C. The production conditions are shown in Table 4, and the evaluation results are shown in Table 5.

Of the obtained white/black zirconia sintered body, the volume ratio of the white zirconia sintered body to the black zirconia sintered body was 41:59, and the relative density was 99.6%.

Then, in the same manner as in Example 6, the obtained white/black zirconia sintered body was processed and subjected to polishing treatment, to obtain a bezel ring having high glossiness.

The obtained bezel ring had a surface made of the black zirconia sintered body and further had a pattern made of the white zirconia sintered body, on the same surface.

The interface of the bezel ring was visually observed, and as a result, it was confirmed that the interface had no blurring of white color and no color bleeding.

Further, the interface of the bezel ring was observed by an optical microscope and SEM observation. As a result, it was confirmed that the white zirconia and the black zirconia were sintered to form an interface, the interface had no gap despite that it had a curvature, and there was no bonding layer.

Further, EPMA composition analyses of the interface of the bezel ring and the vicinity of the interface were conducted. The results are shown in Table 3. Iron element was confirmed in a region within 50 μm from the interface of the white zirconia sintered body, but in a region within 100 μm from the interface, iron element being a coloring component of the black zirconia sintered body, was not confirmed. Further, cobalt element was not confirmed even in a region within 30 μm from the interface. From these results, it was confirmed that in the white/black zirconia sintered body obtained as described above, the migration region of iron was a region within 50 μm from the interface, and there was no migration region of cobalt. Further, the Fe concentration in the vicinity of the interface was 0.5 wt %.

TABLE 4

| | White zirconia powder | | | | Black zirconia powder | Firing temp. (° C.) | HIP treatment (° C., MPa) |
|---|---|---|---|---|---|---|---|
| | Amount of $Y_2O_3$ (mol %) | Amount of $Al_2O_3$ (wt %) | Amount of ZnO (wt %) | Specific surface area ($m^2$g) | | | |
| Example 6 | 3 | 5 | 0 | 15 | TZB | 1,400 | 1,350, 150 |
| Example 7 | 3 | 5 | 0 | 15 | | 1,350 | 1,350, 150 |
| Comp. Ex. 1 | 3 | 5 | 0 | 15 | | 1,450 | — |
| Comp. Ex. 2 | 3 | 5 | 1 | 8 | | 1,450 | — |

*In the Table, "—" represent "not measured".

TABLE 5

| | White/black zirconia sintered body | | | | Fe concentration in white zirconia sintered body (wt %) Distance from interface (μm) | | | | Co concentration in white zirconia sintered body (wt %) Distance from interface (μm) | | | | Color tone (L*a*b* color system) White zirconia sintered body | | |
|---|---|---|---|---|---|---|---|---|---|---|---|---|---|---|---|
| | Theoretical density (g/cm²) | Relative density (%) | Presence or absence of gap at interface | Shrinkage degree ratio | 30 | 50 | 100 | 200 | 30 | 50 | 100 | 200 | L* | a* | b* |
| Example 6 | 6.00 | 99.7 | Absent | 0.98 | 0.5 | 0.5 | 0 | 0 | 0 | 0 | 0 | 0 | 88.42 | −0.55 | 0.96 |
| Example 7 | 6.00 | 99.7 | Absent | 0.98 | 0.5 | 0.4 | 0 | 0 | 0 | 0 | 0 | 0 | 90.35 | −0.88 | 1.02 |
| Comp. Ex. 1 | 6.00 | 99.2 | Present | 0.98 | 0.7 | 0.8 | 0.5 | 0 | 0.5 | 0.5 | 0 | 0 | 90.24 | −0.80 | 1.21 |
| Comp. Ex. 2 | 6.00 | 98.9 | Present | 0.98 | 1.3 | 0.6 | 0.2 | 0 | 1.4 | 0.5 | 0 | 0 | 91.84 | −0.45 | 1.14 |

Example 8

A bezel ring for a timepiece made of a multicolored zirconia sintered body was prepared.
(Preparation of White Zirconia Material)

High purity aluminum oxide (purity: 99.9%) was added to a zirconia powder containing 3 mol % of yttria and having a BET specific surface area of 8 $m^2/g$ (trade name: TZ-3YS, manufactured by Tosoh Corporation), so that the weight of alumina would be 5 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a white zirconia powder.

To the obtained white zirconia powder, an acryl binder was mixed, and the mixture was designated as a white zirconia material. The content of the white zirconia powder in the white zirconia material was 45 vol %.
(Preparation of Blue Zirconia Material)

A spinel oxide powder containing cobalt and aluminum (trade name: aluminum cobalt oxide, manufactured by Wako Pure Chemical Industries, Ltd.) was added to a zirconia powder containing 3 mol % of yttria and having a BET specific surface area of 8 $m^2/g$ (trade name: TZ-3YS, manufactured by Tosoh Corporation), so that the weight of the spinel oxide (hereinafter also referred to simply as "spinel weight") would be 3 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a blue zirconia powder.

To the obtained blue zirconia powder, an acryl binder was mixed, and the mixture was designated as a blue zirconia material. The content of the blue zirconia powder in the blue zirconia material was 45 vol %.
(Preparation of Green Body)

The white zirconia material was injection-molded to obtain a bezel ring-shaped white zirconia green body having convexes. The temperature of the molding die for injection molding was 55° C., and the pressure for injection molding was 100 MPa.

Then, on the obtained white zirconia green body, the above blue zirconia material was injection-molded. The pressure for injection molding was 100 MPa, and the temperature of the molding die for the molding was set to be lower by 5° C. than the injection molding temperature of the white zirconia material. Thus, a green body was obtained wherein the white zirconia green body and the blue zirconia green body were bonded in such a form that the latter was laminated on the former.

The obtained green body was subjected to degreasing treatment in the atmospheric air at a temperature-raising rate of 2.0° C./hr at a degreasing temperature of 450° C. and for a degreasing time of 4 hours.
(Firing and HIP Treatment)

The green body after the degreasing treatment was fired in the atmospheric air at a temperature-raising rate of 100° C./hr at a firing temperature of 1,500° C. and for a firing time of 2 hours, to obtain a preliminarily sintered body.

The obtained preliminarily sintered body was placed in an alumina container and then, subjected to HIP treatment in an atmosphere of argon gas with a purity of 99.9%, at a HIP temperature of 1,450° C. under a HIP pressure of 150 MPa and for a retention time of 1 hour, to obtain a HIP treated product. The obtained HIP treated product was designated as a white/blue zirconia sintered body. The production conditions are shown in Table 6, and the evaluation results are shown in Table 7.

Of the obtained white/blue zirconia sintered body, the volume ratio of the white zirconia sintered body to the blue zirconia sintered body was 41:59, and the relative density was 99.7%.
(Processing into Member)

The surface on the blue zirconia sintered body side of the white/blue zirconia sintered body obtained as described above, was processed until the convexes of the white zirconia sintered body became clearly confirmed. Thus, the white/blue zirconia sintered body was made into a bezel ring having a pattern made of the white zirconia sintered body on the same surface as the blue zirconia sintered body. The bezel ring so after the surface processing, was subjected to polishing treatment to obtain a bezel ring having high glossiness.

The obtained bezel ring had a surface made of the blue zirconia sintered body, and further had a pattern made of the white zirconia sintered body, on the same surface. Further, the interface of the bezel ring was visually observed, whereby the interface was confirmed to have no blurring of white color or no color bleeding.
(Evaluations)

Figure 19:
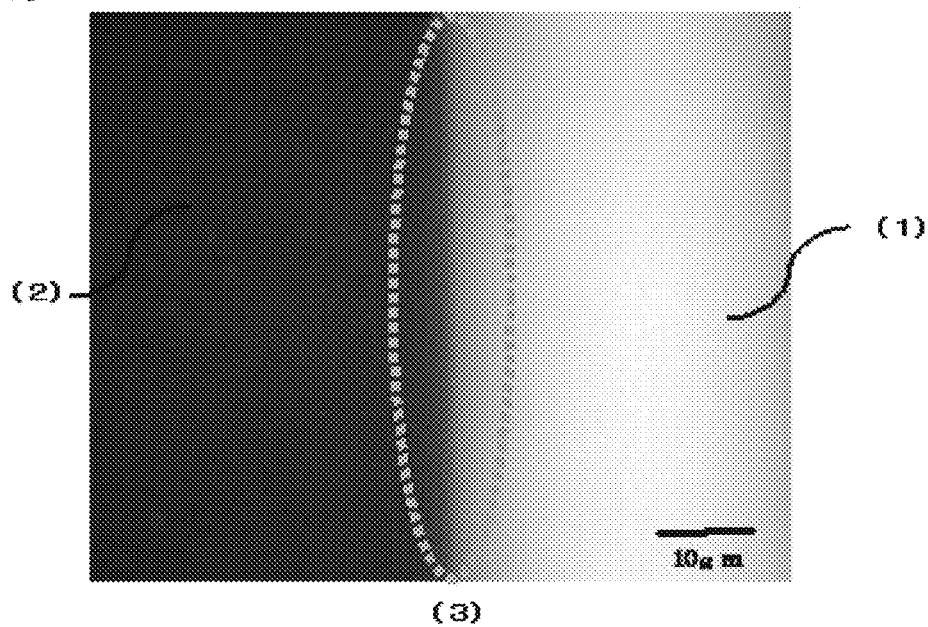
FIG. 19 is an optical micrograph (the scale in the Fig. is 10 µm) of the interface of the white/blue zirconia sintered body in Example 8.

A result of an optical microscopic observation of the interface of the above bezel ring is shown in FIG. 19. It was found that the white zirconia and the blue zirconia were sintered to form an interface (e.g. the dashed oblong portion in FIG. 19).

Figure 20:
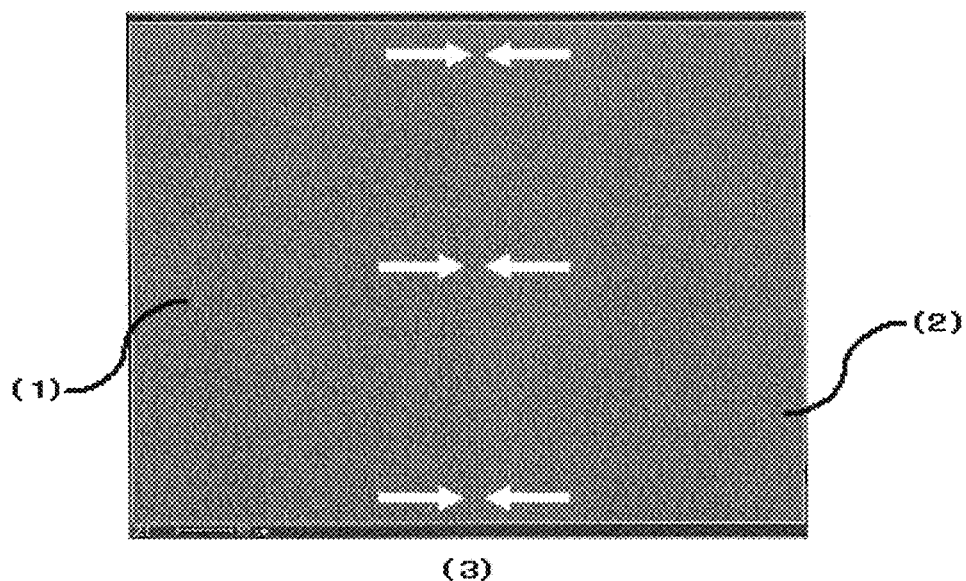
FIG. 20 is a secondary electron image (the scale in the Fig. is 50 µm) of the interface of the white/blue zirconia sintered body in Example 8.

Further, a secondary electron image of the interface of the bezel ring is shown in FIG. 20. Also in the secondary electron image, the interface was confirmed (the portion indicated by arrows in FIG. 20). Further, it was confirmed that no gap was formed at the interface, and there was no bonding layer.

From these results, it was confirmed that the white/blue zirconia sintered body and the bezel ring obtained as described above, had no gap at the interface.

Further, the bezel ring was subjected to a mechanical strength test. Even when an iron ball was dropped thereon from a height of 85 cm, no breakage or cleavage occurred. Thus, it was confirmed that the white/blue zirconia sintered body obtained as described above had a high strength with an impact strength being at least 85 cm.

Example 9

A white/blue zirconia sintered body was obtained by conducting molding, firing and HIP treatment in the same manner as in Example 8 except that by adding the high purity aluminum oxide of the alumina weight to 10 wt %.

Of the obtained white/blue zirconia sintered body, the volume ratio of the white zirconia sintered body to the blue zirconia sintered body was 41:59, and the relative density was 99.7%.

Then, in the same manner as in Example 8, the obtained white/blue zirconia sintered body was processed and subjected to polishing treatment, to obtain a bezel ring having high glossiness.

The obtained bezel ring had a surface made of the blue zirconia sintered body and further had a pattern made of the white zirconia sintered body, on the same surface.

The interface of the bezel ring was visually observed, and as a result, it was confirmed that the interface had no blurring of white color or no color bleeding.

Further, the interface of the bezel ring was observed by an optical microscope and SEM observation. As a result, it was confirmed that the white zirconia and the blue zirconia were sintered to form an interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the white/blue zirconia sintered body obtained as described above had a high strength with an impact strength being at least 85 cm.

Example 10

A white/blue zirconia sintered body was obtained by conducting molding, firing and HIP treatment in the same manner as in Example 8 except that the blue zirconia powder was made to be a mixed powder comprising a spinel oxide powder containing cobalt and aluminum, an iron oxide powder, and a zirconia powder containing 3 mol % of yttria.

That is, a spinel oxide powder containing cobalt and aluminum (trade name: aluminum cobalt oxide, manufactured by Wako Pure Chemical Industries, Ltd.) and a $Fe_2O_3$ powder (trade name: α-$Fe_2O_3$ [3NG], manufactured by Kojundo Chemical Laboratory Co., Ltd.) were added to a zirconia powder containing 3 mol % of yttria and having a BET specific surface area of 8 $m^2/g$ (trade name: TZ-3YS, manufactured by Tosoh Corporation), so that the spinel weight would be 5 wt % and the weight of $Fe_2O_3$ would be 0.1 wt % to the total weight of yttria and zirconia in the zirconia powder containing 3 mol % of yttria. After the addition, using balls made of zirconia and having a diameter of 10 mm, these powders were mixed in a ball mill for 24 hours in an ethanol solvent. The powder after mixing, was dried to obtain a blue zirconia powder. To the obtained blue zirconia powder, an acryl binder was mixed, and using the mixture as a blue zirconia material, a white/blue zirconia sintered body was obtained.

Of the obtained white/blue zirconia sintered body, the volume ratio of the white zirconia sintered body to the blue zirconia sintered body was 41:59, and the relative density of the white/blue zirconia sintered body was 99.8%.

Then, in the same manner as in Example 8, the obtained white/blue zirconia sintered body was processed and subjected to polishing treatment, to obtain a bezel ring having high glossiness.

The obtained bezel ring had a surface made of the blue zirconia sintered body and further had a pattern made of the white zirconia sintered body, on the same surface.

The interface of the bezel ring was visually observed, and as a result, it was confirmed that the interface had no blurring of white color or no color bleeding.

Further, the interface of the bezel ring was observed by an optical microscope and SEM observation. As a result, it was confirmed that the white zirconia and the blue zirconia were sintered to form an interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the white/blue zirconia sintered body obtained as described above had a high strength with an impact strength being at least 85 cm.

Comparative Example 5

A white/blue zirconia sintered body was obtained by conducting molding and firing in the same manner as in Example 8 except that no HIP treatment was conducted. The production conditions are shown in Table 6, and the evaluation results are shown in Table 7.

Of the obtained white/blue zirconia sintered body, the volume ratio of the white zirconia sintered body to the blue zirconia sintered body was 41:59, and the relative density of the white/blue zirconia sintered body was 98.9%.

Then, in the same manner as in Example 8, the obtained white/blue zirconia sintered body was processed and subjected to polishing treatment, to obtain a bezel ring.

The obtained bezel ring had a surface made of the blue zirconia sintered body and further had a pattern made of the white zirconia sintered body, on the same surface.

The interface of the bezel ring was visually observed, and as a result, it was confirmed that the interface had no blurring of white color or no color bleeding.

Figure 21:
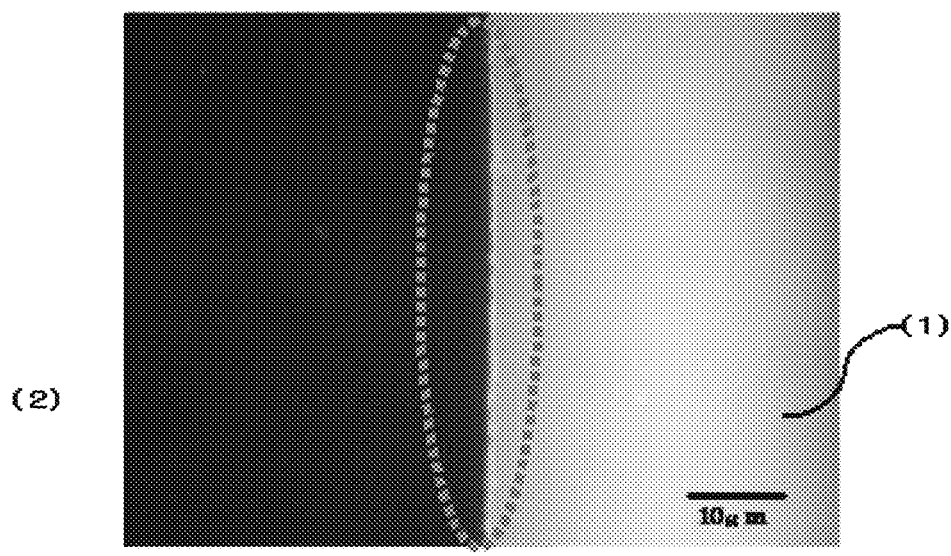
FIG. 21 is an optical micrograph (the scale in the Fig. is 10 µm) of the interface of the white/blue zirconia sintered body in Comparative Example 5.

A result of an optical microscopic observation of the interface of the obtained bezel ring is shown in FIG. 21. From FIG. 21, it was confirmed that the zirconia sintered body had an interface, and the interface had a gap (the dashed oblong portion in FIG. 21).

Figure 22:
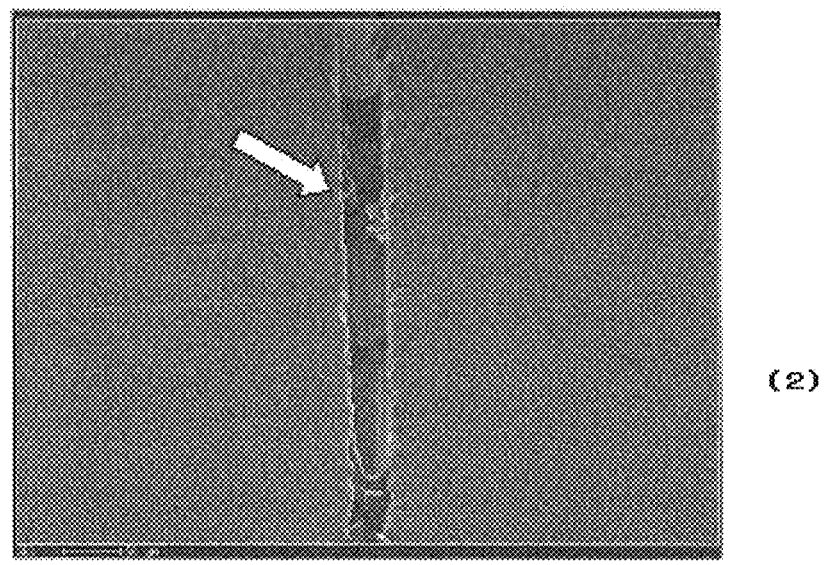
FIG. 22 is a secondary electron image (the scale in the Fig. is 50 µm) of the interface of the white/blue zirconia sintered body in Comparative Example 5.

Further, a secondary electron image of the interface of the bezel ring is shown in FIG. 22. Also from FIG. 22, the zirconia sintered body can be confirmed to have an interface. However, it was confirmed that at the interface, a gap with a width of about 50 μm was formed in a range of at least 500 μm (the portion indicated by an arrow in FIG. 22). Thus, it was confirmed that the interface confirmed by the optical microscopic observation was one containing a very large cleavage.

From these results, it was confirmed that the above white/blue zirconia sintered body had a gap at its interface.

Further, the obtained bezel ring was subjected to a mechanical strength test. When an iron ball was dropped thereon from a height of 10 cm, the white/blue zirconia sintered body obtained as described above, was broken. Thus, it was confirmed that the white/blue zirconia sintered body was poor in mechanical strength with an impact strength of less than 10 cm.

TABLE 6

| | White zirconia powder | | | | Blue zirconia powder | | | | | |
| --- | --- | --- | --- | --- | --- | --- | --- | --- | --- | --- |
| | Amount of $Y_2O_3$ (mol %) | Amount of $Al_2O_3$ (wt %) | Amount of ZnO (wt %) | Specific surface area ($m^2$g) | Amount of $Y_2O_3$ (mol %) | Amount of $CoAl_2O_4$ (wt %) | Amount of $Fe_2O_3$ (wt %) | Specific surface area ($m^2$g) | Firing temperature (° C.) | HIP treatment (° C., MPa) |
| Example 8 | 3 | 5 | 0 | 8 | 3 | 3 | 0 | 8 | 1,500 | 1,450, 150 |
| Example 9 | 3 | 10 | 0 | 8 | 3 | 3 | 0 | 8 | 1,500 | 1,450, 150 |
| Example 10 | 3 | 5 | 0 | 8 | 3 | 5 | 0.1 | 8 | 1,500 | 1,450, 150 |
| Comparative Example 5 | 3 | 5 | 1 | 8 | 3 | 3 | 0 | 8 | 1,500 | — |

*In the Table, "—" represent "not measured".

TABLE 7

| | White/blue zirconia sintered body | | | | | | | | |
|---|---|---|---|---|---|---|---|---|---|
| | Theoretical density | Relative | Presence or absence of gap at | Color tone (L*a*b* color system) | | | | | |
| | | | | White zirconia sintered body | | | Blue zirconia sintered body | | |
| | (g/cm²) | density (%) | interface | L* | a* | b* | L* | a* | b* |
| Example 8 | 5.98 | 99.7 | Absent | 88.42 | −0.65 | 0.91 | 35.52 | 10.52 | −64.2 |
| Example 9 | 5.93 | 99.7 | Absent | 92.35 | −0.78 | 1.25 | 33.41 | 9.85 | −61.25 |
| Example 10 | 5.96 | 99.8 | Absent | 89.14 | −0.57 | 0.85 | 22.85 | 18.54 | −52.35 |
| Comparative Example 5 | 5.98 | 98.9 | Present | 90.05 | −0.45 | 1.35 | 30.85 | 7.38 | −58.54 |

Example 11

A pink/black zirconia sintered body composed of a pink zirconia sintered body and a black zirconia sintered body, was prepared.

(Preparation of Pink Zirconia Material)

An erbium oxide powder (trade name: Erbium Oxide, manufactured by Shin-Etsu Chemical Co., Ltd.) was added to a zirconia powder containing 3 mol % of yttria and 0.25 wt % of alumina and having a BET specific surface area of 8 m²/g (trade name: TZ-3YSE, manufactured by Tosoh Corporation), so that the weight of erbium (hereinafter also referred to simply as "erbium weight") would be 2 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a pink zirconia powder.

To the obtained pink zirconia powder, an acryl binder was mixed, and the mixture was designated as a pink zirconia material. The content of the white zirconia powder in the pink zirconia material was 45 vol %.

(Preparation of Black Zirconia Material)

A commercially available black zirconia powder (trade name: TZ-Black, manufactured by Tosoh Corporation) was used as a black zirconia powder. This powder is a powder comprising zirconia containing 3 mol % of yttria and a spinel oxide having the following composition and containing iron and cobalt, wherein a part of cobalt is substituted by Zn, and a part of iron is substituted by Al. Here, the content of the spinel oxide in the black zirconia powder is 3.5 wt %.

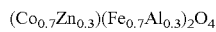

$(Co_{0.7}Zn_{0.3})(Fe_{0.7}Al_{0.3})_2O_4$

Further, to the above black zirconia powder, an acryl binder was mixed, and the mixture was designated as a black zirconia material. Here, the content of a black zirconia powder in the black zirconia material was 45 vol %.

(Preparation of Secondary Green Body)

The above pink zirconia material was injection-molded to obtain a bezel ring-shaped pink zirconia green body having convexes. The conditions for the injection molding were such that the temperature of the molding die for injection molding was 60° C., and the pressure was 100 MPa.

Then, on the obtained pink zirconia green body, the black zirconia material was injection-molded. A secondary green body was thereby obtained wherein the pink zirconia green body and the black zirconia green body were bonded in such a form that the latter was laminated on the former. The temperature of the molding die for the secondary molding was set to be 50° C., whereby the primary molding temperature was higher by 10° C. than the secondary molding temperature.

The obtained green body was subjected to degreasing treatment in the atmospheric air at a temperature-raising rate of 2.0° C./hr at a degreasing temperature of 450° C. and for a degreasing time of 4 hours.

(Firing and HIP Treatment)

The green body after the degreasing treatment was fired in the atmospheric air at a temperature-raising rate of 100° C./hr at a firing temperature of 1,400° C. and for a firing time of 2 hours, to obtain a primary sintered body.

The obtained primary sintered body was placed in an alumina container and then, subjected to HIP treatment in an atmosphere of argon gas with a purity of 99.9%, at a HIP temperature of 1,350° C. under a HIP pressure of 150 MPa and for a retention time of 1 hour, to obtain a HIP treated product. The obtained HIP treated product was designated as a pink/black zirconia sintered body. The production conditions are shown in Table 8, and the evaluation results are shown in Table 9.

Of the obtained pink/black zirconia sintered body, the volume ratio of the pink zirconia sintered body to the black zirconia sintered body was 41:59, and the relative density was 99.8%.

(Processing into Member)

The surface on the black zirconia sintered body side of the pink/black zirconia sintered body obtained as described above, was processed until the convexes of the pink zirconia sintered body became clearly confirmed. Thus, the pink/black zirconia sintered body was made into a bezel ring having a pattern made of the pink zirconia sintered body on the same surface as the black zirconia sintered body. The bezel ring after the surface processing, was subjected to polishing treatment to obtain a bezel ring having high glossiness.

The obtained bezel ring was in a ring shape having an outer diameter of 40 mm, an inner diameter of 30 mm and a width of 5 mm. Further, the thickness was 2 mm.

The bezel ring had a surface made of the black zirconia sintered body, and further had a pattern made of the pink zirconia sintered body, on the same surface.

The interface of the bezel ring was visually observed, and as a result, it was confirmed that the interface had no blurring of pink color or no color bleeding.

Figure 23:
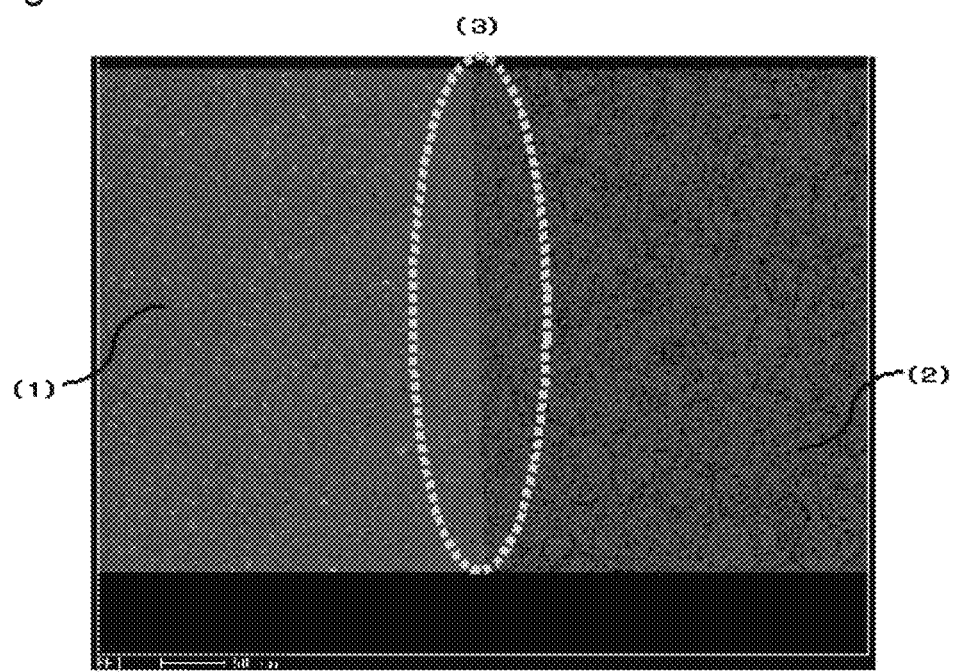
FIG. 23 is a reflection electron image (the scale in the Fig. is 50 µm) of the pink/black zirconia sintered body in Example 11.

Further, the interface of the bezel ring was observed by an optical microscope and SEM observation. A reflection electron image by the SEM observation is shown in FIG. 23. It was confirmed that the pink zirconia and the black zirconia were sintered to form an interface, the interface had no gap, and there was no bonding layer.

Further, the bezel ring was subjected to a mechanical strength test. Even when an iron ball was dropped thereon from a height of 85 cm, no breakage or cleavage occurred. Thus, it was confirmed that the pink/black zirconia sintered body obtained as described above had a high strength with an impact strength being at least 85 cm.

Example 12

An orange/black zirconia sintered body composed of an orange zirconia sintered body and a black zirconia sintered body, was prepared.

That is, a praseodymium oxide powder (trade name: Praseodymium Oxide, manufactured by Shin-Etsu Chemical Co., Ltd.) was added to a zirconia powder containing 3 mol % of yttria and 0.25 wt % of alumina and having a BET specific surface area of 8 m$^2$/g (trade name: TZ-3YSE, manufactured by Tosoh Corporation), so that the weight of praseodymium (hereinafter also referred to simply as "praseodymium weight") would be 3 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain an orange zirconia powder.

An orange/black zirconia sintered body was obtained by conducting molding, firing and HIP treatment in the same manner as in Example 11 except that the orange zirconia powder was used instead of the pink zirconia powder. The production conditions are shown in Table 8, and the evaluation results are shown in Table 9.

Of the obtained orange/black zirconia sintered body, the volume ratio of the orange zirconia sintered body to the black zirconia sintered body was 41:59, and the relative density was 99.8%.

Then, in the same manner as in Example 11, the obtained orange/black zirconia sintered body was processed and subjected to polishing treatment, to obtain a bezel ring having high glossiness.

The obtained bezel ring had a surface made of the black zirconia sintered body and further had a pattern made of the orange zirconia sintered body, on the same surface.

The interface of the bezel ring was visually observed, and as a result, it was confirmed that the interface had no blurring of orange color and no color bleeding.

Further, the interface of the bezel ring was observed by an optical microscope and SEM observation. As a result, it was confirmed that the orange zirconia and the black zirconia were sintered to form an interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the orange/black zirconia sintered body obtained as described above had a high strength with an impact strength being at least 85 cm.

Example 13

A lavender/black zirconia sintered body composed of a lavender zirconia sintered body and a black zirconia sintered body, was prepared.

That is, a neodymium oxide powder (trade name: Neodymium Oxide, manufactured by Shin-Etsu Chemical Co., Ltd.) was added to a zirconia powder containing 3 mol % of yttria and 0.25 wt % of alumina and having a BET specific surface area of 8 m$^2$/g (trade name: TZ-3YSE, manufactured by Tosoh Corporation), so that the weight of neodymium (hereinafter also referred to simply as "neodymium weight") would be 2 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a lavender zirconia powder.

A lavender/black zirconia sintered body was obtained by conducting molding, firing and HIP treatment in the same manner as in Example 11 except that the lavender zirconia powder was used instead of the pink zirconia powder. The production conditions are shown in Table 8, and the evaluation results are shown in Table 9.

Of the obtained lavender/black zirconia sintered body, the volume ratio of the lavender zirconia sintered body to the black zirconia sintered body was 41:59, and the relative density was 99.5%.

Then, in the same manner as in Example 11, the obtained lavender/black zirconia sintered body was processed and subjected to polishing treatment, to obtain a bezel ring having high glossiness.

The obtained bezel ring had a surface made of the black zirconia sintered body and further had a pattern made of the lavender zirconia sintered body, on the same surface.

The interface of the bezel ring was visually observed, and as a result, it was confirmed that the interface had no blurring of lavender color and no color bleeding.

Further, the interface of the bezel ring was observed by an optical microscope and SEM observation. As a result, it was confirmed that the lavender zirconia and the black zirconia were sintered to form an interface, the interface had no gap despite that it had a curvature, and there was no bonding layer.

Further, the obtained bezel ring was subjected to a mechanical strength test. Even when an iron ball was dropped thereon from a height of 85 cm, no breakage or cleavage occurred. Thus, it was confirmed that the lavender/black zirconia sintered body obtained as described above had a high strength with an impact strength being at least 85 cm.

TABLE 8

| | Light-colored zirconia powder | | | | Black zirconia powder | Firing temperature (° C.) | HIP treatment (° C., MPa) |
|---|---|---|---|---|---|---|---|
| | Amount of $Y_2O_3$ (mol %) | Amount of $Al_2O_3$ (wt %) | Coloring component (wt %) | Specific surface area (m$^2$g) | | | |
| Example 11 | 3 | 0.25 | Er (2) | 8 | TZB | 1,400 | 1,350, 150 |
| Example 12 | 3 | 0.25 | Pr (3) | 8 | | 1,400 | 1,350, 150 |
| Example 13 | 3 | 0.25 | Nd (2) | 8 | | 1,400 | 1,350, 150 |

TABLE 9

| | Light/colored/black zirconia sintered body | | | Color tone (L*a*b* color system) | | | | | |
|---|---|---|---|---|---|---|---|---|---|
| | Theoretical density | Relative | Presence or absence of gap at | Light/colored zirconia sintered body | | | Black zirconia sintered body | | |
| | (g/cm³) | density (%) | interface | L* | a* | b* | L* | a* | b* |
| Example 11 | 6.08 | 99.8 | Absent | 79.73 | 11.09 | −3.54 | 0.01 | 0.05 | 0.01 |
| Example 12 | 6.03 | 99.8 | Absent | 68.16 | 15.38 | 59.38 | 0.01 | 0.04 | 0.01 |
| Example 13 | 6.03 | 99.5 | Absent | 75.06 | 5.90 | −12.42 | 0.01 | 0.05 | 0.01 |

Example 14

A pink/blue zirconia sintered body composed of a pink zirconia sintered body and a blue zirconia sintered body, was prepared.
(Preparation of Pink Zirconia Material)

An erbium oxide powder (trade name: Erbium Oxide, manufactured by Shin-Etsu Chemical Co., Ltd.) was added to a zirconia powder containing 3 mol % of yttria and 0.25 wt % of alumina and having a BET specific surface area of 8 m²/g (trade name: TZ-3YSE, manufactured by Tosoh Corporation), so that the erbium weight would be 2 wt %.

After the addition, using balls made of zirconia and having a diameter of 10 mm, these powders were mixed in a ball mill for 24 hours in an ethanol solvent. The powder after mixing, was dried to obtain a pink zirconia powder.

To the obtained pink zirconia powder, an acryl binder was mixed, and the mixture was designated as a pink zirconia material. The content of the pink zirconia powder in the pink zirconia material was 45 vol %.
(Preparation of Blue Zirconia Material)

A spinel oxide powder containing cobalt and aluminum (trade name: aluminum cobalt oxide, manufactured by Wako Pure Chemical Industries, Ltd.) was added to a zirconia powder containing 3 mol % of yttria and having a BET specific surface area of 8 m²/g (trade name: TZ-3Y, manufactured by Tosoh Corporation), so that the weight of the spinel oxide (spinel weight) would be 3 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a blue zirconia powder.

To the obtained blue zirconia powder, an acryl binder was mixed, and the mixture was designated as a blue zirconia material. The content of the blue zirconia powder in the blue zirconia material was 45 vol %.
(Preparation of Green Body)

The pink zirconia material was injection-molded to obtain a bezel ring-shaped pink zirconia green body having convexes. The pressure for injection molding was 100 MPa.

Then, on the obtained pink zirconia green body, the above blue zirconia material was injection-molded. The pressure for injection molding was 100 MPa, and the temperature of the molding die for the molding was set to be lower by 5° C. than the injection molding temperature of the pink zirconia material. Thus, a green body was obtained wherein the pink zirconia green body and the blue zirconia green body were bonded in such a form that the latter was laminated on the former.

The obtained green body was subjected to degreasing treatment in the atmospheric air at a temperature-raising rate of 2.0° C./hr at a degreasing temperature of 450° C. and for a degreasing time of 4 hours.

(Firing and HIP Treatment)

The green body after the degreasing treatment was fired in the atmospheric air at a temperature-raising rate of 100° C./hr at a firing temperature of 1,450° C. and for a firing time of 2 hours, to obtain a preliminarily sintered body.

The obtained preliminarily sintered body was placed in an alumina container and then, subjected to HIP treatment in an atmosphere of argon gas with a purity of 99.9%, at a HIP temperature of 1,400° C. under a HIP pressure of 150 MPa and for a retention time of 1 hour, to obtain a HIP treated product. The obtained HIP treated product was designated as a pink/blue zirconia sintered body. The production conditions are shown in Table 10, and the evaluation results are shown in Table 11.

Of the obtained pink/blue zirconia sintered body, the volume ratio of the pink zirconia sintered body to the blue zirconia sintered body was 41:59, and the relative density of the pink/blue zirconia sintered body was 99.9%.
(Processing into Member)

The surface on the blue zirconia sintered body side of the pink/blue zirconia sintered body obtained as described above, was processed until the convexes of the pink zirconia sintered body became clearly confirmed. Thus, the pink/blue zirconia sintered body was made into a bezel ring having a pattern made of the pink zirconia sintered body on the same surface as the blue zirconia sintered body. The bezel ring after the surface processing, was subjected to polishing treatment to obtain a bezel ring having high glossiness.

The obtained bezel ring had a surface made of the blue zirconia sintered body, and further had a pattern made of the pink zirconia sintered body, on the same surface.

Further, the interface of the bezel ring was visually observed, whereby the interface was confirmed to have no blurring of pink color or no color bleeding.

Figure 24:
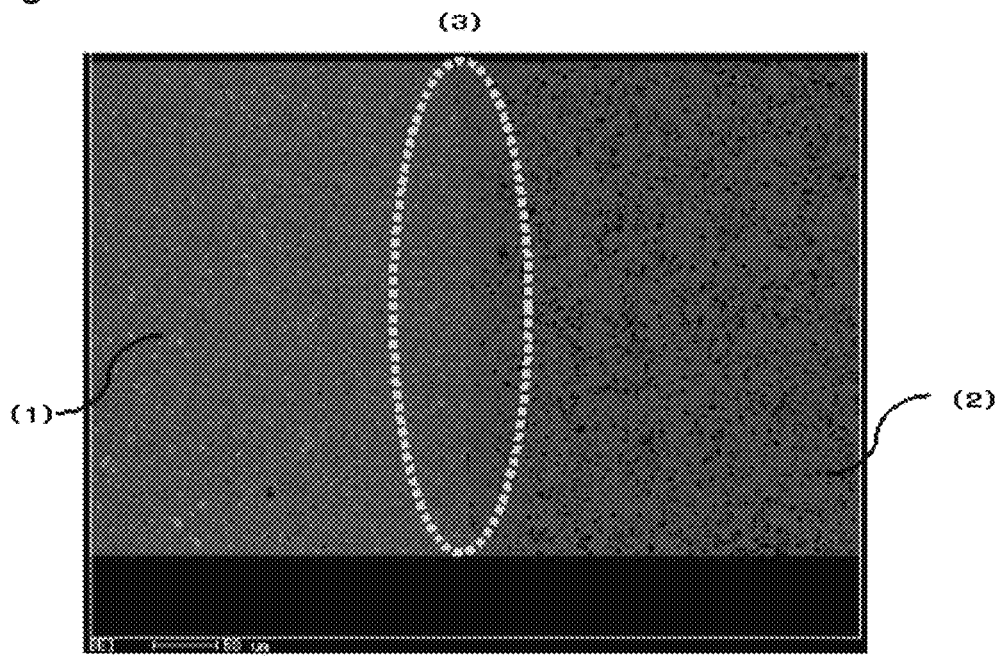
FIG. 24 is a reflection electron image (the scale in the Fig. is 50 µm) of the pink/blue zirconia sintered body in Example 14.

Further, the interface of the bezel ring was observed by an optical microscope and SEM observation. A reflection electron image obtained by the SEM observation is shown in FIG. 24. It was confirmed that the pink zirconia and the blue zirconia were sintered to form an interface, the interface had no gap, and there was no bonding layer (the dashed oblong portion in FIG. 24).

Further, the obtained bezel ring was subjected to a mechanical strength test. Even when an iron ball was dropped thereon from a height of 85 cm, no breakage or cleavage occurred. Thus, it was confirmed that the pink/blue zirconia sintered body obtained as described above had a high strength with an impact strength being at least 85 cm.

Example 15

An orange/blue zirconia sintered body composed of an orange zirconia sintered body and a blue zirconia sintered body, was prepared.

That is, a praseodymium oxide powder (trade name: Praseodymium Oxide, manufactured by Shin-Etsu Chemical Co., Ltd.) was added to a zirconia powder containing 3 mol % of yttria and 0.25 wt % of alumina and having a BET specific surface area of 8 m²/g (trade name: TZ-3YSE, manufactured by Tosoh Corporation), so that the praseodymium weight would be 3 wt %.

After the addition, using balls made of zirconia and having a diameter of 10 mm, these powders were mixed in a ball mill for 24 hours in an ethanol solvent. The powder after mixing, was dried to obtain an orange zirconia powder.

An orange/blue zirconia sintered body was obtained by conducting molding, firing and HIP treatment in the same manner as in Example 14 except that the orange zirconia powder was used instead of the pink zirconia powder. The production conditions are shown in Table 10, and the evaluation results are shown in Table 11.

Of the obtained orange/blue zirconia sintered body, the volume ratio of the orange zirconia sintered body to the blue zirconia sintered body was 41:59, and the relative density of the orange/blue zirconia sintered body was 99.8%.

Then, in the same manner as in Example 14, the obtained orange/blue zirconia sintered body was processed and subjected to polishing treatment, to obtain a bezel ring having high glossiness.

The obtained bezel ring had a surface made of the blue zirconia sintered body and further had a pattern made of the orange zirconia sintered body, on the same surface.

The interface of the bezel ring was visually observed, and as a result, it was confirmed that the interface had no blurring of orange color and no color bleeding.

Further, the interface of the bezel ring was observed by an optical microscope and SEM observation. As a result, it was confirmed that the orange zirconia and the blue zirconia were sintered to form an interface, the interface had no gap despite that it had a curvature, and there was no bonding layer.

Further, the bezel ring was subjected to a mechanical strength test. Even when an iron ball was dropped thereon from a height of 85 cm, no breakage or cleavage occurred. Thus, it was confirmed that the orange/blue zirconia sintered body obtained as described above had a high strength with an impact strength being at least 85 cm.

Reference Example

A green/black zirconia sintered body composed of a green zirconia sintered body and a black zirconia sintered body, was prepared.

That is, a nickel oxide powder (trade name: Nickel Oxide, manufactured by Kojundo Chemical Laboratory Co., Ltd.) was added to a zirconia powder containing 3 mol % of yttria and 0.25 wt % of alumina and having a BET specific surface area of 15 m²/g (trade name: TZ-3YSE, manufactured by Tosoh Corporation), so that the weight of nickel oxide would be 4 wt % to the total weight of yttria and zirconia in the zirconia powder containing 3 mol % of yttria, and a silica powder (trade name: 1-FX, manufactured by Tatsumori Ltd.) was added, so that the weight of silica (SiO2) would be 2 wt % to the total weight of yttria and zirconia in the zirconia powder containing 3 mol % of yttria.

After the addition, using balls made of zirconia and having a diameter of 10 mm, these powders were mixed in a ball mill for 24 hours in an ethanol solvent. The powder after mixing, was dried to obtain a green zirconia powder.

A green/black zirconia sintered body was obtained by conducting molding, firing and HIP treatment in the same manner as in Example 1 except that the green zirconia powder was used instead of the white zirconia powder, and the firing temperature was set to be 1,400° C. The production conditions are shown in Table 12, and the evaluation results are shown in Table 13.

Of the obtained green/black zirconia sintered body, the volume ratio of the green zirconia sintered body to the black zirconia sintered body was 41:59, and the relative density of the green/black zirconia sintered body was 99.9%.

Then, in the same manner as in Example 1, the obtained green/black zirconia sintered body was processed and subjected to polishing treatment, to obtain a bezel ring having high glossiness.

The obtained bezel ring had a surface made of the black zirconia sintered body and further had a pattern made of the green zirconia sintered body, on the same surface.

TABLE 10

| | Light-colored zirconia powder | | | | Blue zirconia powder | | | | |
|---|---|---|---|---|---|---|---|---|---|
| | Amount of $Y_2O_3$ (mol %) | Amount of $Al_2O_3$ (wt %) | Coloring component (wt %) | Specific surface area (m²g) | Amount of $Y_2O_3$ (mol %) | Amount of $CoAl_2O_4$ (wt %) | Specific surface area (m²/g) | Firing temperature (° C.) | HIP treatment (° C., MPa) |
| Example 14 | 3 | 5 | Er (2) | 8 | 3 | 3 | 8 | 1,450 | 1,400, 150 |
| Example 15 | 3 | 10 | Pr (3) | 8 | 3 | 3 | 8 | 1,450 | 1,400, 150 |

TABLE 11

| | Light-colored/blue zirconia sintered body | | | Color tone (L*a*b* color system) | | | | | |
|---|---|---|---|---|---|---|---|---|---|
| | Theoretical density (g/cm²) | Relative density (%) | Presence or absence of gap at interface | Light-colored zirconia sintered body | | | Blue zirconia sintered body | | |
| | | | | L* | a* | b* | L* | a* | b* |
| Example 14 | 6.08 | 99.9 | Absent | 80.25 | 13.23 | −2.32 | 35.48 | 11.23 | −62.20 |
| Example 15 | 6.07 | 99.8 | Absent | 67.18 | 15.02 | 60.05 | 35.24 | 10.58 | −61.25 |

The interface of the bezel ring was visually observed, and as a result, it was confirmed that the interface had no blurring of green color and no color bleeding.

Further, the interface of the bezel ring was observed by an optical microscope and SEM observation. As a result, it was confirmed that the green zirconia and the black zirconia were sintered to form an interface, the interface had no gap despite that it had a curvature, and there was no bonding layer.

Further, the obtained bezel ring was subjected to a mechanical strength test. Even when an iron ball was dropped thereon from a height of 85 cm, no breakage or cleavage occurred. Thus, it was confirmed that the green/black zirconia sintered body obtained as described above had a high strength.

As a result, it has been found that by making a light-colored sintered body by using, instead of at least either a light-colored lanthanoid or aluminum oxide, a zirconia sintered body containing silica and a transition metal oxide, the above-described green/black zirconia sintered body is obtainable as a multicolored zirconia sintered body with a deeply colored sintered body being a zirconia sintered body containing a spinel oxide.

pressing was subjected to cold isostatic press (CIP) treatment to obtain a secondary green body. The pressure for the CIP treatment was 200 MPa, and the molding temperature was at most room temperature.
(Firing and HIP Treatment)

A white/black zirconia sintered body was obtained by firing and HIP treatment in the same manner as in Example 1 except that the obtained secondary green body was used.
(Processing into Member)

Figure 25:
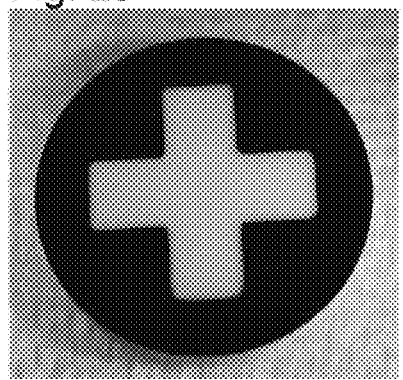
FIG. 25 is an outer appearance of the white/black zirconia sintered body in Example 16.

The surface on the black zirconia sintered body side of the white/black zirconia sintered body obtained as described above, was processed until the convexes of the white zirconia sintered body became clearly confirmed. Thus, the white/black zirconia sintered body was made into a disk-shaped zirconia sintered body having a pattern made of the white zirconia sintered body on the same surface as the black zirconia sintered body. The disk-shaped zirconia sintered body after the surface processing, was subjected to polishing treatment to obtain a disk-shaped zirconia sintered body having high glossiness. The outer appearance of the obtained disk-shaped zirconia sintered body is shown in FIG. 25.

The obtained disk-shaped zirconia sintered body had a diameter of 16 mm and a thickness of 2.5 mm, and the width of the pattern was 3 mm.

TABLE 12

| | Green zirconia powder | | | | | | |
|---|---|---|---|---|---|---|---|
| | Amount of $Y_2O_3$ (mol %) | Amount of $Al_2O_3$ (wt %) | Amount of $NiO_2$ (wt %) | Amount of $SiO_2$ (wt %) | Specific surface area ($m^2/g$) | Black zirconia powder | Firing temperature (° C.) | HIP treatment (° C., MPa) |
| Reference Example | 3 | 0.25 | 4 | 2 | 15 | TZB | 1,400 | 1,350 150 |

TABLE 13

| | Green/blue zirconia sintered body | | | | | | | |
|---|---|---|---|---|---|---|---|---|
| | | | Presence | Color tone (L*a*b* color system) | | | | |
| | Theoretical density | Relative | or absence of gap at | Green zirconia sintered body | | | Black zirconia sintered body | | |
| | ($g/cm^2$) | density (%) | interface | L* | a* | b* | L* | a* | b* |
| Reference Example | 6.04 | 99.9 | Absent | 39.67 | −18.42 | 24.48 | 0.01 | 0.04 | 0.02 |

Example 16

A disk-shaped white/black zirconia sintered body composed of a white zirconia sintered body and a black zirconia sintered body, was prepared.
(Preparation of Materials)

A white zirconia powder obtained in the same manner as in Example 1 was used as a white zirconia material, and a commercially available black zirconia powder (trade name: TZ-Black, manufactured by Tosoh Corporation) was used as a black zirconia material.
(Preparation of Green Body)

The white zirconia material was subjected to uniaxial pressing at room temperature to obtain a convex primary green body. On the obtained primary green body, the black zirconia powder was packed, and the primary green body and the black zirconia powder were simultaneously subjected to uniaxial pressing. The green body after the uniaxial The interface of the disk-shaped zirconia sintered body was visually observed, and as a result, it was confirmed that the interface had no blurring of white color and no color bleeding.

Further, the interface of the disk-shaped zirconia sintered body was observed by an optical microscope and SEM observation. As a result, it was confirmed that the white zirconia and the black zirconia were sintered to form an interface, the interface had no gap despite that it had a curvature, and there was no bonding layer.

Example 17

A white/black zirconia sintered body was obtained by conducting molding, firing and HIP treatment in the same manner as in Example 16 except that a zirconia powder containing 3 mol % of yttria and having a BET specific surface area of 15 $m^2/g$ (trade name: TZ-3Y, manufactured by Tosoh Corporation) was used, the high purity aluminum oxide was added so that the alumina weight would be 10 wt %, the firing temperature was changed to be 1,450° C., and the HIP treatment temperature was changed to be 1,400° C. Further, the obtained white/black zirconia sintered body was processed in the same manner as in Example 16, to obtain a disk-shaped zirconia sintered body having a diameter of 16 mm, a thickness of 2.5 mm and a width of the pattern being 3 mm.

The obtained disk-shaped zirconia sintered body had a surface made of the black zirconia sintered body and further had a pattern made of the white zirconia sintered body, on the same surface.

The interface of the disk-shaped zirconia sintered body was visually observed, and as a result, it was confirmed that the interface had no blurring of white color and no color bleeding.

Further, the interface of the disk-shaped zirconia sintered body was observed by an optical microscope and SEM observation. As a result, it was confirmed that the white zirconia and the black zirconia were sintered to form an interface, the interface had no gap, and there was no bonding layer.

Example 18

A white/black zirconia sintered body was obtained by conducting molding, firing and HIP treatment in the same manner as in Example 16 except that a zirconia powder containing 3 mol % of yttria and having a BET specific surface area of 15 m$^2$/g (trade name: TZ-3Y, manufactured by Tosoh Corporation) was used, and the firing temperature was changed to be 1,400° C. Further, the obtained white/black zirconia sintered body was processed in the same manner as in Example 16, to obtain a disk-shaped zirconia sintered body having a diameter of 16 mm, a thickness of 2.5 mm and a width of the pattern being 3 mm.

The obtained disk-shaped zirconia sintered body had a surface made of the black zirconia sintered body and further had a pattern made of the white zirconia sintered body, on the same surface.

The interface of the disk-shaped zirconia sintered body was visually observed, and as a result, it was confirmed that the interface had no blurring of white color and no color bleeding.

Further, the interface of the disk-shaped zirconia sintered body was observed by an optical microscope and SEM observation. As a result, it was confirmed that the white zirconia and the black zirconia were sintered to form an Interface, the interface had no gap, and there was no bonding layer.

Example 19

A white/black zirconia sintered body was obtained by conducting molding, firing and HIP treatment in the same manner as in Example 16 except that a zirconia powder containing 3 mol % of yttria and having a BET specific surface area of 15 m$^2$/g (trade name: TZ-3Y, manufactured by Tosoh Corporation) was used. Further, the obtained white/black zirconia sintered body was processed in the same manner as in Example 16, to obtain a disk-shaped zirconia sintered body having a diameter of 16 mm, a thickness of 2.5 mm and a width of the pattern being 3 mm.

The obtained disk-shaped zirconia sintered body had a surface made of the black zirconia sintered body and further had a pattern made of the white zirconia sintered body, on the same surface.

The interface of the disk-shaped zirconia sintered body was visually observed, and as a result, it was confirmed that the interface had no blurring of white color and no color bleeding.

Further, the interface of the disk-shaped zirconia sintered body was observed by an optical microscope and SEM observation. As a result, it was confirmed that the white zirconia and the black zirconia were sintered to form an interface, the interface had no gap, and there was no bonding layer.

Example 20

A disk-shaped white/blue zirconia sintered body composed of a white zirconia sintered body and a blue zirconia sintered body, was prepared.
(Preparation of Materials)

A white zirconia powder obtained in the same manner as in Example 8 was used as a white zirconia material, and a blue zirconia powder obtained in the same manner as in Example 8 was used as a blue zirconia material.
(Preparation of Green Body)

The white zirconia material was subjected to uniaxial pressing at room temperature to obtain a convex primary green body. On the obtained primary green body, the blue zirconia powder was packed, and the primary green body and the blue zirconia powder were simultaneously subjected to uniaxial pressing. The green body after the uniaxial pressing was subjected to cold isostatic press (CIP) treatment to obtain a secondary green body. The pressure for the CIP treatment was 200 MPa, and the molding temperature was at most room temperature.
(Firing and HIP Treatment)

A white/blue zirconia sintered body was obtained in the same manner as in Example 8 except that the firing temperature was changed to 1,450° C. and the HIP treatment temperature was changed to 1,350° C.
(Processing into Member)

Figure 26:
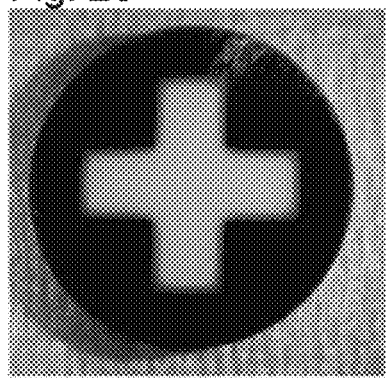
FIG. 26 is an outer appearance of the white/blue zirconia sintered body in Example 20.

The surface on the blue zirconia sintered body side of the white/blue zirconia sintered body obtained as described above, was processed until the convexes of the white zirconia sintered body became clearly confirmed. Thus, the white/blue zirconia sintered body was made into a disk-shaped zirconia sintered body having a pattern made of the white zirconia sintered body on the same surface as the blue zirconia sintered body. The disk-shaped zirconia sintered body after the surface processing, was subjected to polishing treatment to obtain a disk-shaped zirconia sintered body having high glossiness. The outer appearance of the obtained disk-shaped zirconia sintered body is shown in FIG. 26.

The obtained disk-shaped zirconia sintered body had a diameter of 16 mm and a thickness of 2.5 mm, and the width of the pattern was 3 mm.

The obtained disk-shaped zirconia sintered body had a surface made of the blue zirconia sintered body and further had a pattern made of the white zirconia sintered body, on the same surface.

The interface of the disk-shaped zirconia sintered body was visually observed, and as a result, it was confirmed that the interface had no blurring of white color and no color bleeding.

Further, the interface of the disk-shaped zirconia sintered body was observed by an optical microscope and SEM observation. As a result, it was confirmed that the white zirconia and the blue zirconia were sintered to form an interface, the interface had no gap, and there was no bonding layer.

Example 21

A white/blue zirconia sintered body was obtained by conducting molding, firing and HIP treatment in the same manner as in Example 20 except that the high purity aluminum oxide (purity: 99.9%) was added to a zirconia powder containing 3 mol % of yttria and having a BET specific surface area of 8 m$^2$/g (trade name: TZ-3Y, manufactured by Tosoh Corporation), so that the alumina weight would be 10 wt %. Further, the obtained white/blue zirconia sintered body was processed in the same manner as in Example 20, to obtain a disk-shaped zirconia sintered body having a diameter of 16 mm, a thickness of 2.5 mm and a width of the pattern being 3 mm.

The obtained disk-shaped zirconia sintered body had a surface made of the blue zirconia sintered body and further had a pattern made of the white zirconia sintered body, on the same surface.

The interface of the disk-shaped zirconia sintered body was visually observed, and as a result, it was confirmed that the Interface had no blurring of white color and no color bleeding.

Further, the interface of the disk-shaped zirconia sintered body was observed by an optical microscope and SEM observation. As a result, it was confirmed that the white zirconia and the blue zirconia were sintered to form an interface, the interface had no gap, and there was no bonding layer.

Example 22

A white/blue zirconia sintered body was obtained by conducting molding, firing and HIP treatment in the same manner as in Example 20 except that a blue zirconia powder obtained in the same manner as in Example 10 was used as the blue zirconia material. Further, the obtained white/blue zirconia sintered body was processed in the same manner as in Example 20, to obtain a disk-shaped zirconia sintered body having a diameter of 16 mm, a thickness of 2.5 mm and a width of the pattern being 3 mm.

The obtained disk-shaped zirconia sintered body had a surface made of the blue zirconia sintered body and further had a pattern made of the white zirconia sintered body, on the same surface.

The interface of the disk-shaped zirconia sintered body was visually observed, and as a result, it was confirmed that the interface had no blurring of white color and no color bleeding.

Further, the interface of the disk-shaped zirconia sintered body was observed by an optical microscope and SEM observation. As a result, it was confirmed that the white zirconia and the blue zirconia were sintered to form an interface, the interface had no gap, and there was no bonding layer.

Example 23

A disk-shaped pink/black zirconia sintered body composed of a pink zirconia sintered body and a black zirconia sintered body, was prepared.
(Preparation of Materials)
A pink zirconia powder obtained in the same manner as in Example 11 was used as a pink zirconia material, and a commercially available black zirconia powder (trade name: TZ-Black, manufactured by Tosoh Corporation) was used as a black zirconia material.
(Preparation of Green Body)

The pink zirconia material was subjected to uniaxial pressing at room temperature to obtain a convex primary green body. On the obtained primary green body, the black zirconia powder was packed, and the primary green body and the black zirconia powder were simultaneously subjected to uniaxial pressing. The green body after the uniaxial pressing was subjected to cold isostatic press (CIP) treatment to obtain a secondary green body. The pressure for the CIP treatment was 200 MPa, and the molding temperature was at most room temperature.
(Firing and HIP Treatment)

A pink/black zirconia sintered body was obtained in the same manner as in Example 11 except that the obtained secondary green body was used.
(Processing into Member)

Figure 27:
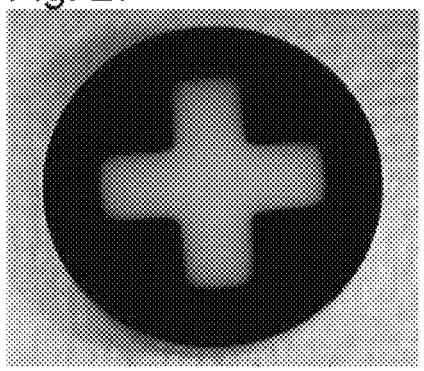
FIG. 27 is an outer appearance of the pink/black zirconia sintered body in Example 23.

The surface on the black zirconia sintered body side of the pink/black zirconia sintered body obtained as described above, was processed until the convexes of the pink zirconia sintered body became clearly confirmed. Thus, the pink/black zirconia sintered body was made into a disk-shaped zirconia sintered body having a pattern made of the pink zirconia sintered body on the same surface as the black zirconia sintered body. The disk-shaped zirconia sintered body after the surface processing, was subjected to polishing treatment to obtain a disk-shaped zirconia sintered body having high glossiness. The outer appearance of the obtained disk-shaped zirconia sintered body is shown in FIG. 27.

The obtained disk-shaped zirconia sintered body had a diameter of 16 mm and a thickness of 2.5 mm, and the width of the pattern was 3 mm.

The obtained disk-shaped zirconia sintered body had a surface made of the black zirconia sintered body and further had a pattern made of the pink zirconia sintered body, on the same surface.

The interface of the disk-shaped zirconia sintered body was visually observed, and as a result, it was confirmed that the interface had no blurring of pink color and no color bleeding.

Further, the interface of the disk-shaped zirconia sintered body was observed by an optical microscope and SEM observation. As a result, it was confirmed that the pink zirconia and the black zirconia were sintered to form an interface, the interface had no gap, and there was no bonding layer.

Example 24

A disk-shaped orange/black zirconia sintered body composed of an orange zirconia sintered body and a black zirconia sintered body, was prepared.

An orange/black zirconia sintered body was obtained by conducting molding, firing and HIP treatment in the same manner as in Example 23 except that instead of the pink zirconia material, an orange zirconia powder obtained in the same manner as in Example 12 was used as the orange zirconia material. Further, the obtained orange/black zirconia sintered body was processed in the same manner as in Example 20, to obtain a disk-shaped zirconia sintered body having a diameter of 16 mm, a thickness of 2.5 mm and a width of the pattern being 3 mm.

The obtained disk-shaped zirconia sintered body had a surface made of the black zirconia sintered body and further had a pattern made of the orange zirconia sintered body, on the same surface.

The interface of the disk-shaped zirconia sintered body was visually observed, and as a result, it was confirmed that the interface had no blurring of orange color and no color bleeding.

Further, the interface of the disk-shaped zirconia sintered body was observed by an optical microscope and SEM observation. As a result, it was confirmed that the orange zirconia and the black zirconia were sintered to form an interface, the interface had no gap, and there was no bonding layer.

Example 25

A disk-shaped lavender/black zirconia sintered body composed of a lavender zirconia sintered body and a black zirconia sintered body, was prepared.

A lavender/black zirconia sintered body was obtained by conducting molding, firing and HIP treatment in the same manner as in Example 23 except that instead of the pink zirconia material, a lavender zirconia powder obtained in the same manner as in Example 13 was used as the lavender zirconia material. Further, the obtained lavender/black zirconia sintered body was processed in the same manner as in Example 20, to obtain a disk-shaped zirconia sintered body having a diameter of 16 mm, a thickness of 2.5 mm and a width of the pattern being 3 mm.

The obtained disk-shaped zirconia sintered body had a surface made of the black zirconia sintered body and further had a pattern made of the lavender zirconia sintered body, on the same surface.

The interface of the disk-shaped zirconia sintered body was visually observed, and as a result, it was confirmed that the interface had no blurring of lavender color and no color bleeding.

Further, the Interface of the disk-shaped zirconia sintered body was observed by an optical microscope and SEM observation. As a result, it was confirmed that the lavender zirconia and the black zirconia were sintered to form an interface, the interface had no gap, and there was no bonding layer.

Example 26

A disk-shaped pink/blue zirconia sintered body composed of a pink zirconia sintered body and a blue zirconia sintered body, was prepared.
(Preparation of Materials)

A pink zirconia powder obtained in the same manner as in Example 14 was used as a pink zirconia material, and a blue zirconia powder obtained in the same manner as in Example 14 was used as a blue zirconia material.
(Preparation of Green Body)

The pink zirconia material was subjected to uniaxial pressing at room temperature to obtain a convex primary green body. On the obtained primary green body, the blue zirconia powder was packed, and the primary green body and the blue zirconia powder were simultaneously subjected to uniaxial pressing. The green body after the uniaxial pressing was subjected to cold isostatic press (CIP) treatment to obtain a secondary green body. The pressure for the CIP treatment was 200 MPa, and the molding temperature was at most room temperature.

(Firing and HIP Treatment)
A pink/blue zirconia sintered body was obtained in the same manner as in Example 14 except that the obtained secondary green body was used.
(Processing into Member)

Figure 28:
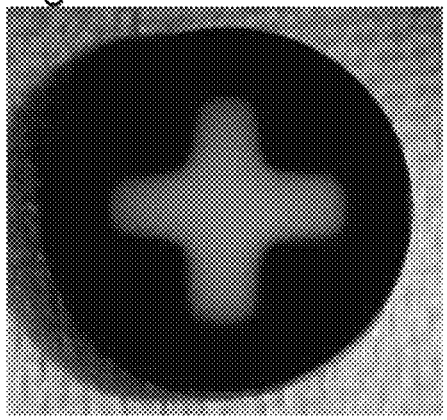
FIG. 28 is an outer appearance of the pink/blue zirconia sintered body in Example 26.

The surface on the blue zirconia sintered body side of the pink/blue zirconia sintered body obtained as described above, was processed until the convexes of the pink zirconia sintered body became clearly confirmed. Thus, the pink/blue zirconia sintered body was made into a disk-shaped zirconia sintered body having a pattern made of the pink zirconia sintered body on the same surface as the blue zirconia sintered body. The disk-shaped zirconia sintered body after the surface processing, was subjected to polishing treatment to obtain a disk-shaped zirconia sintered body having high glossiness. The outer appearance of the obtained disk-shaped zirconia sintered body is shown in FIG. 28.

The obtained disk-shaped zirconia sintered body had a diameter of 16 mm and a thickness of 2.5 mm, and the width of the pattern was 3 mm.

The obtained disk-shaped zirconia sintered body had a surface made of the blue zirconia sintered body and further had a pattern made of the pink zirconia sintered body, on the same surface.

The interface of the disk-shaped zirconia sintered body was visually observed, and as a result, it was confirmed that the interface had no blurring of pink color and no color bleeding.

Further, the interface of the disk-shaped zirconia sintered body was observed by an optical microscope and SEM observation. As a result, it was confirmed that the pink zirconia and the blue zirconia were sintered to form an interface, the interface had no gap, and there was no bonding layer.

Example 27

A disk-shaped orange/blue zirconia sintered body composed of an orange zirconia sintered body and a blue zirconia sintered body, was prepared.

An orange/blue zirconia sintered body was obtained by conducting molding, firing and HIP treatment in the same manner as in Example 26 except that instead of the pink zirconia material, an orange zirconia powder obtained in the same manner as in Example 15 was used as the orange zirconia material. Further, the obtained orange/blue zirconia sintered body was processed in the same manner as in Example 20, to obtain a disk-shaped zirconia sintered body having a diameter of 16 mm, a thickness of 2.5 mm and a width of the pattern being 3 mm.

The obtained disk-shaped zirconia sintered body had a surface made of the blue zirconia sintered body and further had a pattern made of the orange zirconia sintered body, on the same surface.

The interface of the disk-shaped zirconia sintered body was visually observed, and as a result, it was confirmed that the interface had no blurring of orange color and no color bleeding.

Further, the interface of the disk-shaped zirconia sintered body was observed by an optical microscope and SEM observation. As a result, it was confirmed that the orange zirconia and the blue zirconia were sintered to form an interface, the interface had no gap, and there was no bonding layer.

INDUSTRIAL APPLICABILITY

The zirconia sintered body of the present invention is widely useful for e.g. timepiece components, ornaments, mobile device components, vehicle components, high grade commodities, etc. Particularly, the zirconia sintered body of the present invention can be used for a timepiece component such as a timepiece band, a bezel, a dial face or a timepiece case, an ornament such as a pin, a tie clip, a handbag clasp or a bracelet, an exterior equipment such as a portable electronic device housing, a lighter case, a cosmetic case, a cell phone case or an earphone housing, as well as for articles for daily use such as knives, kitchen utensils, etc., or logos for various products, etc.

The entire disclosures of Japanese Patent Application No. 2013-272110, Japanese Patent Application No. 2013-272111 and Japanese Patent Application No. 2013-272113, filed on Dec. 27, 2013 including specifications, claims, drawings and summaries are incorporated herein by reference in their entireties.

REFERENCE SYMBOLS (1): a light-colored sintered body
(2): a deeply colored sintered body
(3): an interface
(4): a region of the light-colored sintered body at a predetermined distance from the interface
(5): a circle with a diameter of 10 μm, formed by taking at its center the region of the light-colored sintered body at a predetermined distance from the interface

The invention claimed is:

1. A zirconia sintered body, which has a crystal grin structure comprising a first zirconia sintered body and a second zirconia sintered body, wherein:
the first zirconia sintered body comprises at least aluminum oxide or at least one lanthanoid selected from the group consisting of Ce, Pr, Nd, Eu, Tb, Ho, Er, Yb and Gd;
the second zirconia sintered body comprises a spinel oxide;
a grain boundary is formed between the first zirconia sintered body and the second zirconia sintered body; and
the grain boundary has no gap and no color bleeding.

2. The zirconia sintered body according to claim 1, wherein either one of the first zirconia sintered body and the second zirconia sintered body forms a pattern on the same surface as the other zirconia sintered body.

3. The zirconia sintered body according to claim 1, wherein a relative density is at least 99.5%.

4. The zirconia sintered body according to claim 1, wherein the first zirconia sintered body comprises aluminum oxide.

5. The zirconia sintered body according to claim 1, wherein the first zirconia sintered body comprises aluminum oxide in an amount of from 0.25 wt % to 20 wt %.

6. The zirconia sintered body according to claim 1, wherein the first zirconia sintered body comprises at least one lanthanoid selected from the group consisting of Ce, Pr, Nd, Eu, Tb, Ho, Er, Yb and Gd.

7. The zirconia sintered body according to claim 6, wherein the lanthanoid is contained in an amount of from 0.1 wt % to 6 wt %.

8. The zirconia sintered body according to claim 1, wherein the spinel oxide contained in the second zirconia sintered body is a spinel oxide comprising iron and cobalt.

9. The zirconia sintered body according to claim 1, wherein the spinel oxide contained in the second zirconia sintered body has the following composition:

$(Co_X M^{2+}_{1-X})(Fe_Y M^{3+}_{1-Y})_2 O_4$ wherein
$M^{2+}$ is at least either Zn or Mn,
$M^{3+}$ is either Al or Cr,
$0.1 < X \leq 1$, and
$0.5 < Y \leq 1$.

10. The zirconia sintered body according to claim 1, wherein the spinel oxide contained in the second zirconia sintered body is a spinel oxide comprising cobalt and aluminum.

11. The zirconia sintered body according to claim 10, wherein the second zirconia sintered body further comprises a transition metal oxide.

12. A process for producing the zirconia sintered body of claim 1, the process comprising:
primary molding either one zirconia powder of a zirconia powder comprising a lanthanoid oxide or aluminum oxide, or a zirconia powder comprising a spinel oxide, to obtain a primary green body;
secondary molding the other zirconia powder on the primary green body at a molding temperature lower than the primary molding, to obtain a secondary green body;
firing the secondary green body at a temperature of at least 1,300° C. to obtain a preliminarily sintered body; and
subjecting the preliminarily sintered body to hot isostatic pressing treatment at a temperature of from 1,250° C. to 1,650° C. under from 100 MPa to 250 MPa.

13. The process according to claim 12, wherein the molding in the secondary molding is injection molding.

14. A member, comprising the zirconia sintered body of claim 1.

* * * * *